US007909689B2

(12) United States Patent
Lardie

(10) Patent No.: US 7,909,689 B2
(45) Date of Patent: Mar. 22, 2011

(54) METHODS AND APPARATUS FOR REMOTE GAMING

(75) Inventor: Brant Lardie, Reno, NV (US)

(73) Assignee: IGT, Reno, NV (US)

( * ) Notice: Subject to any disclaimer, the term of this patent is extended or adjusted under 35 U.S.C. 154(b) by 656 days.

(21) Appl. No.: 11/873,378

(22) Filed: Oct. 16, 2007

(65) Prior Publication Data

US 2008/0176627 A1 Jul. 24, 2008

Related U.S. Application Data

(63) Continuation of application No. 10/628,544, filed on Jul. 28, 2003, now abandoned.

(51) Int. Cl.
*A63F 9/24* (2006.01)
*A63F 13/00* (2006.01)
*A63F 13/12* (2006.01)

(52) U.S. Cl. ................ 463/16; 463/13; 463/17; 463/20; 463/42; 273/138.1; 273/139; 709/203; 709/219; 710/20; 902/10; 902/23

(58) Field of Classification Search ............ 463/1, 9–13, 463/16, 20, 25, 29, 40–43, 17–19; 273/108.1, 273/145 R, 147, 141 A, 317.1, 351, 454–456, 273/460–461, 138.1, 139; 704/E15.047; 709/203–207, 216–219, 225, 227, FOR. 106, 709/FOR. 111, FOR. 112, FOR. 115, FOR. 122, 709/FOR. 130, FOR. 131, FOR. 132, FOR. 141, 709/FOR. 148, FOR. 149, FOR. 153; 710/18, 710/20; 715/200, 700, 706, 738, 744, 757–758, 715/762–764; 902/10, 23

See application file for complete search history.

(56) References Cited

U.S. PATENT DOCUMENTS 5,119,295 A 6/1992 Kapur (Continued)

FOREIGN PATENT DOCUMENTS

AU 2004260994 2/2005

(Continued)

OTHER PUBLICATIONS

Examination Report dated May 16, 2006 for corresponding UK Patent Application No. GB0602499.6.

(Continued)

*Primary Examiner* — David L Lewis
*Assistant Examiner* — Arthur O. Hall
(74) *Attorney, Agent, or Firm* — Weaver Austin Villeneuve & Sampson LLP

(57) ABSTRACT

A gaming apparatus may include a display unit capable of generating video images, a first value input device, and a controller operatively coupled to the display unit and the value input device. The first value input device may be located at a first geographic location. The controller may comprise a processor and a memory, and may be programmed to allow a person to make a wager, to cause a first video image to be generated on the display unit, and to determine a first value payout associated with an outcome of a game. The first video image may represent a first game wagered on the first value input device. The controller may also cause a second video image to be generated on the display unit. The second video image may represent a second game wagered on at a second value input device located at a second geographic location different from the first geographic location.

18 Claims, 18 Drawing Sheets

U.S. PATENT DOCUMENTS

| | | | | |
|---|---|---|---|---|
| 5,688,174 | A * | 11/1997 | Kennedy | 463/37 |
| 5,762,552 | A * | 6/1998 | Vuong et al. | 463/25 |
| 6,117,013 | A | 9/2000 | Eiba | |
| 6,264,557 | B1 * | 7/2001 | Schneier et al. | 463/29 |
| 6,358,150 | B1 | 3/2002 | Mir et al. | |
| 6,682,421 | B1 * | 1/2004 | Rowe et al. | 463/25 |
| 6,773,347 | B1 * | 8/2004 | Marshall et al. | 463/25 |
| 6,846,238 | B2 * | 1/2005 | Wells | 463/39 |
| 6,945,870 | B2 * | 9/2005 | Gatto et al. | 463/29 |
| 7,128,652 | B1 * | 10/2006 | Lavoie et al. | 463/42 |
| 7,690,991 | B2 * | 4/2010 | Black | 463/26 |
| 2001/0041612 | A1 | 11/2001 | Garahi et al. | |
| 2002/0094860 | A1 | 7/2002 | Itkis et al. | |
| 2002/0147049 | A1 | 10/2002 | Carter | |
| 2002/0183105 | A1 * | 12/2002 | Cannon et al. | 463/16 |
| 2002/0198052 | A1 | 12/2002 | Soltys et al. | |
| 2003/0050114 | A1 | 3/2003 | Leen et al. | |
| 2003/0064784 | A1 | 4/2003 | Wells et al. | |
| 2003/0114217 | A1 * | 6/2003 | Walker et al. | 463/20 |
| 2004/0009812 | A1 * | 1/2004 | Scott et al. | 463/28 |
| 2005/0005127 | A1 * | 1/2005 | Rowe et al. | 713/182 |
| 2008/0318656 | A1 * | 12/2008 | Walker et al. | 463/20 |

FOREIGN PATENT DOCUMENTS

| | | |
|---|---|---|
| GB | 2419098 | 4/2006 |
| WO | WO01/75825 | 10/2001 |
| WO | WO01/77861 | 10/2001 |
| WO | WO03/042830 | 5/2003 |

OTHER PUBLICATIONS

Examination Report dated Oct. 31, 2006 for corresponding UK Patent Application No. GB0602499.6.

Examination Report dated Jul. 6, 2007 for corresponding UK Patent Application No. GB0602499.6.

International Search Report and Written Opinion dated Nov. 22, 2004 for corresponding PCT Patent Application No. PCT/US2004/021906.

International Preliminary Report on Patentability dated Jan. 30, 2006 for corresponding PCT Patent Application No. PCT/US2004/021906.

Office Action dated Jun. 20, 2006 for related U.S. Appl. No. 10/628,544.

Office Action dated Apr. 16, 2007 for related U.S. Appl. No. 10/628,544.

Examination Report dated Jan. 8, 2008 for corresponding UK Patent Application No. GB0602499.6.

Examination Report dated Feb. 7, 2008 for corresponding UK Patent Application No. GB0602499.6.

Chinese Office Action dated Sep. 5, 2008 for corresponding Chinese Patent Application No. 200480023898.9.

Australian Examination Report dated Oct. 15, 2007 for corresponding Australian Patent Application No. 2004260994.

Australian Examination Report dated Sep. 25, 2008 for corresponding Australian Patent Application No. 2004260994.

Chinese Office Action dated Apr. 10, 2009 for corresponding Chinese Patent Application No. 200480023898.9, 4 pgs.

Chinese Office Action dated Sep. 4, 2009 for corresponding Chinese Patent Application No. 200480023898.9, 14 pgs.

Chinese Office Action mailed Apr. 22, 2010, from Application No. 200480023898.9.

* cited by examiner

FIG. 11
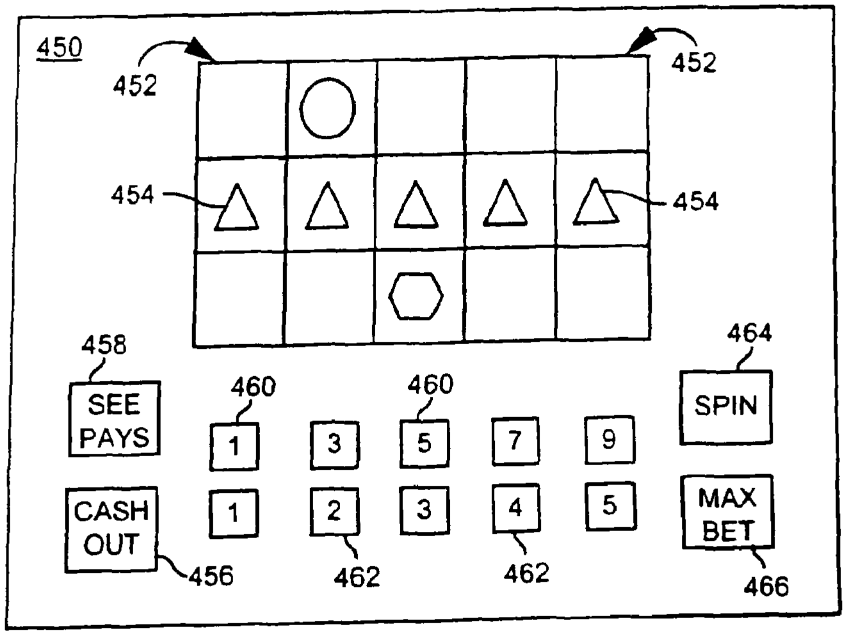
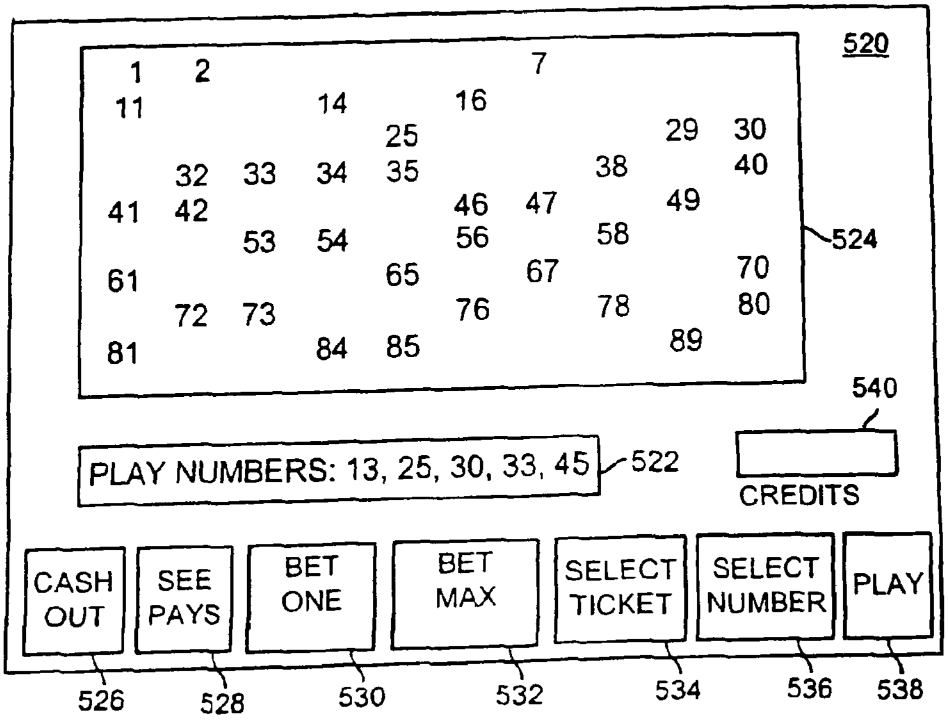
FIG. 12

FIG. 20
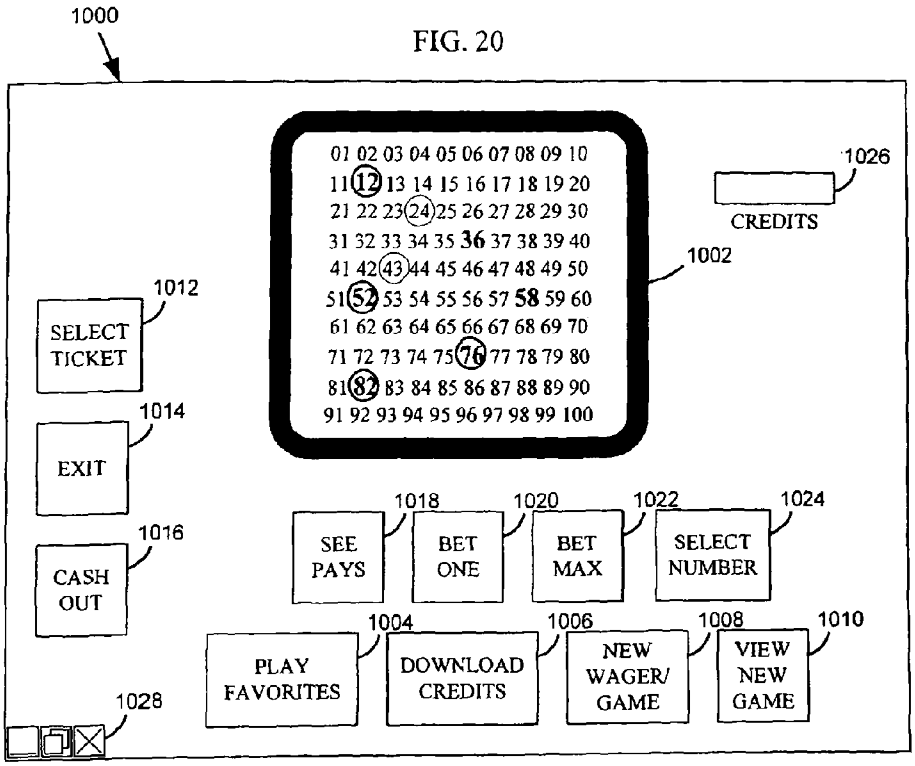
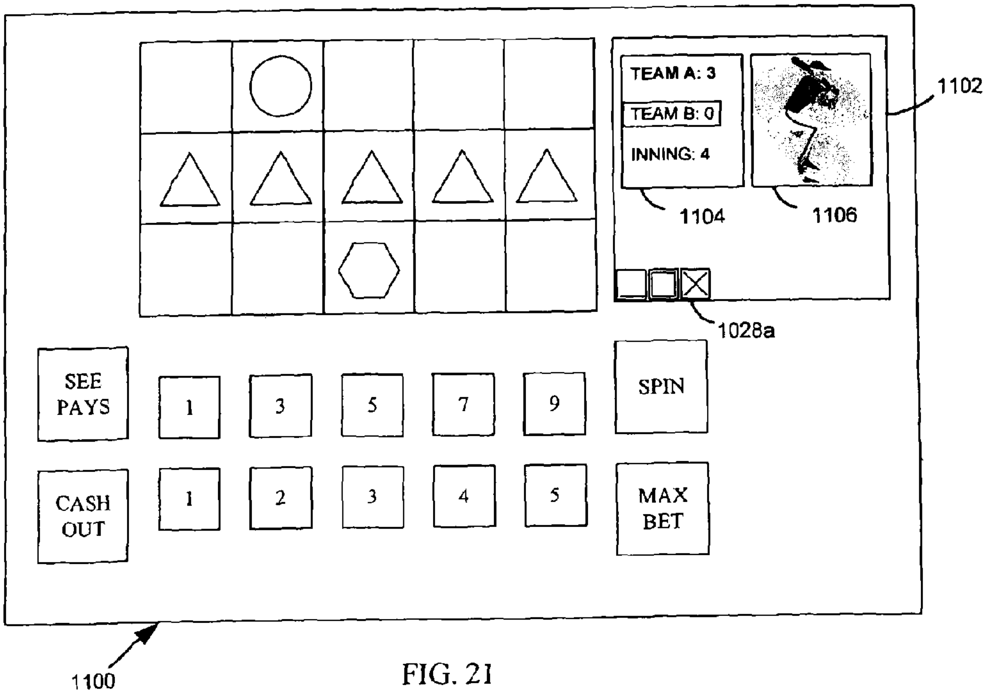
FIG. 21

METHODS AND APPARATUS FOR REMOTE GAMING

RELATED APPLICATION DATA

The present application is a continuation application of and claims priority to commonly assigned and co-pending U.S. Application Ser. No. 10/628,544, filed Jul. 28, 2003, by Lardie, titled "Method and Apparatus for Remote Gaming," which is incorporated by reference herein in its entirety.

BACKGROUND

This patent is directed to a casino gaming apparatus, which could be either an individual gaming unit or a casino gaming system having a plurality of gaming units, that is capable of providing a player viewing capability and control over a game initiated by the player at a different location.

Conventional gaming units often allowed a player to wager on, control and view the game initiated at that particular gaming unit. Gaines initiated at another location were not displayed on the gaming unit or otherwise allowed the player control over the remote game via the gaming unit. That is, a player could not wager on a game at a first location and view the progress of that game or make further wagers on that game at a gaming unit at another location. For example, a player who wagers on a conventional multi-player lottery game fills out a card, wagers on chosen numbers and watches a large, public keno display screen to view the progress of the keno game, such as what numbers have or have not been randomly selected. The player must either stay and watch the keno display screen, or return to the keno display screen periodically to check the status of the game (e.g., to see if his numbers were chosen). If the player wants to begin gaming at a gaming unit, which may be at a different location and out of sight of the keno display screen, he is unable to view the progress of the keno game or make a further wager on the keno game without leaving the gaming unit to return to the keno display screen. Sports gaming (e.g., placing a wager on the outcome of a horse race, baseball game, etc.) can result in similar occurrences. Such public display screens were also not personalized to a particular player's gaming decisions and whether the player's gaming decisions coincided with the outcome of the game.

Some conventional gaming units allowed the player to control the gaming unit remotely using a remote control device similar to those used to control televisions. Other conventional gaming units allowed a player to control gaming from a remote location by using video cameras to transmit a picture of the game (e.g., a roulette table, a slot machine, etc.) to the player's location (e.g., a hotel room). The player could then place wagers by placing a phone call to someone at the location of the gaming unit who would place a wager on behalf of the player.

SUMMARY OF THE INVENTION

In one aspect, the invention is directed to a gaming apparatus that may include a display unit capable of generating video images, a first value input device, and a controller operatively coupled to the display unit and the first value input device. The first value input device may be located at a first geographic location. The controller may comprise a processor and a memory, and may be programmed to allow a person to make a wager, cause a first video image representing a first game wagered on at the first value input device to be generated on the display unit, cause a second video image representing a second game wagered on at a second value input device to be generated on the display unit, and to determine an outcome of the first game and a first value payout associated with the outcome of the game. The second value input device may be located at a second geographic location different from the first geographic location. The first game may be a single-player game and the second game may be a multi-player game.

The first video image may represent one of the following games: video poker, video blackjack, video slots, video keno and video bingo, in which case the first video image may comprise an image of at least five playing cards if the first game comprises video poker; the first video image may comprise an image of a plurality of simulated slot machine reels if the first game comprises video slots; the first video image may comprise an image of a plurality of playing cards if the first game comprises video blackjack; the first video image may comprise an image of a plurality of keno numbers if the first game comprises video keno, and the first video image may comprise an image of a bingo grid if the first game comprises video bingo.

The second video image may represent one of the following games: a multi-player lottery and multi-player sports gaming, in which case said second video image may comprise an image of a plurality of lottery numbers if the second game comprises a multi-player lottery, and said second video image may comprise an image of a sports score if the second game comprises multi-player sports gaming. The second video image may also comprise an image of a gaming decision made by the person in relation to the second game.

The controller may further be programmed to allow the person to make a wager on the first game and/or the second game using the first value input device. The controller may also be programmed to receive a second value payout associated with an outcome of the second game. The second value payout may be determined by a multi-player gaming server. The controller may be programmed to cause the first and second video images to be generated concurrently on the display unit. The controller may be programmed to receive identification information regarding the person and also receive gaming information regarding the wager on the second game using the identification information. The gaming information may include a gaming decision may by the person.

A gaming system may comprise a plurality of interconnected gaming apparatuses that form a first network of gaming apparatuses. A second network may be operatively coupled to the first network. The second network may include the second value input device and a multi-player gaming server operatively coupled to the second value input device. The gaming server may be programmed to allow one or more people to make a wager on the second value input device. The people may include the person. The gaming server may also be programmed to determine the second value payout and to transfer gaming information regarding the second game to the controller. The gaming information may include the second value payout and information regarding gaming decisions by said player.

The invention is also directed to a gaming method that may comprise causing a first video image representing a first game wagered on at a first geographic location to be generated, determining a first value payout associated with an outcome of the first game, and causing a second video image representing a second game wagered on at a second geographic location different from the first geographic location to be generated.

In another aspect, the invention is directed to a memory that may include a computer program that may be capable of being used in connection with a gaming apparatus. The memory may comprise a first memory portion physically configured in accordance with computer program instructions that may cause the gaming apparatus to allow a person to make a wager at a first geographic location with a first value input device; a second memory portion physically configured in accordance with computer program instructions that may cause the gaming apparatus to cause a first video image representing a first game to be generated on a display unit; a third memory portion physically configured in accordance with computer program instructions that may cause the gaming apparatus to determine a first value payout associated with an outcome of the first game; and a fourth memory portion physically configured in accordance with computer program instructions that may cause the gaming apparatus to cause a second video image to be generated on the display unit. the second video image may represent a second game wagered on at a second geographic location with a second value input device. The first video image may represent a first game selected from the group of games wagered on at the first geographic location, the first group of games including video poker, video blackjack, video slots, and video bingo, in which case the first video image may comprise an image of at least five playing cards if the first game comprises video poker; the first video image may comprise an image of a plurality of simulated slot machine reels if the first game comprises video slots; the first video image may comprise an image of a plurality of playing cards if the first game comprises video blackjack; and the first video image may comprise an image of a bingo grid if the first game comprises video bingo.

Additional aspects of the invention are defined by the claims of this patent.

BRIEF DESCRIPTION OF THE DRAWINGS

FIG. 11 is an illustration of an embodiment of a visual display that may be displayed during performance of the slots routine of FIG. 13;

FIG. 12 is an illustration of an embodiment of a visual display that may be displayed during performance of the video keno routine of FIG. 14;

FIG. 20 is an illustration of a first embodiment of a visual display that may be displayed during performance of the remote gaming routine of FIG. 19; and FIG. 21 is an illustration of a second embodiment of a visual display that may be displayed during performance of the remote gaming routine of FIG. 19.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean. . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
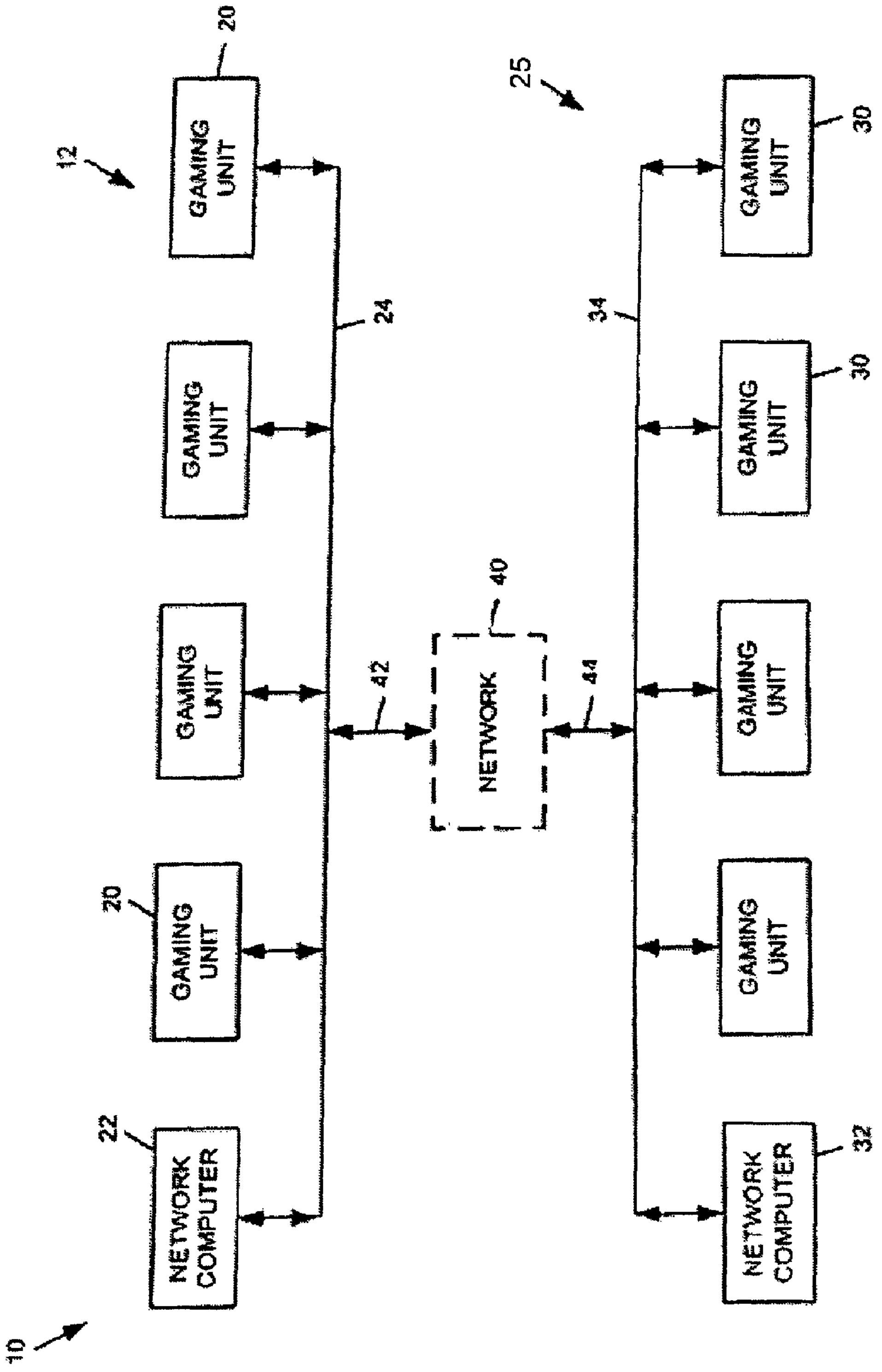
FIG. 1 is a block diagram of an embodiment of a gaming system.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 25 of casino gaming units 30 operatively coupled to a network computer 32 via a network data link or bus 34. The first and second gaming networks 12, 25 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 25 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 25 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
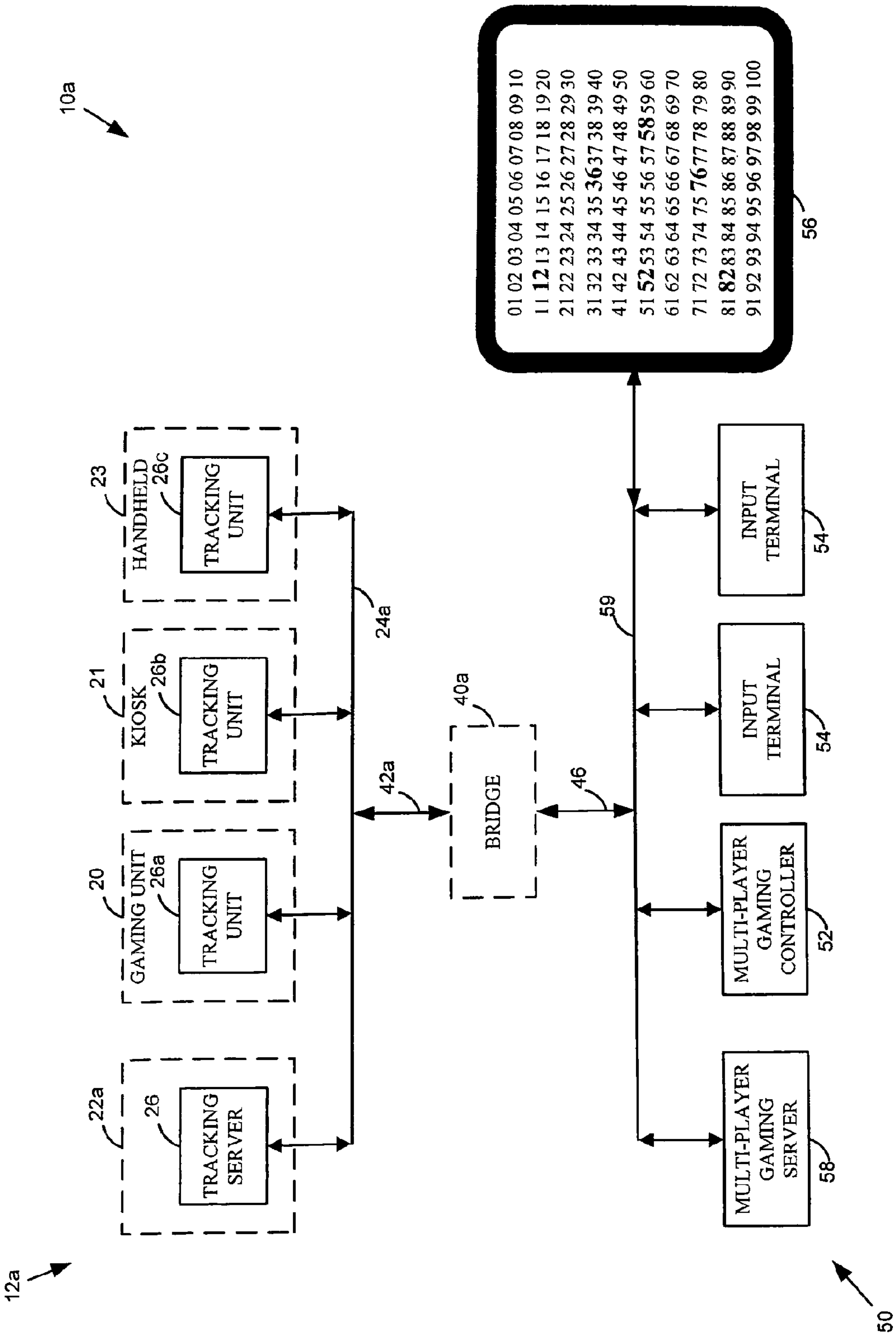
FIG. 2 is an illustration of an alternative embodiment of a gaming system.

FIG. 2 illustrates a second possible embodiment of a casino gaming system 10*a* that permits a player to remotely monitor and wager on a remote multi-player game such as a lottery game or sports gaming by multiple players on a sporting event. The casino gaming system 10*a* may be modeled similar to the casino gaming system 10 described above with reference to FIG. 1. Although the following description addresses the use of a network 12*a* of gaming units 20, it should be understood that the network 14 of gaming units 30 may have the same design as or be modified to resemble the network 12*a* described below. The network 14 of gaming units 30 may replace the first network 12*a* or be operatively coupled to the first network 12*a*, as referred to above.

Referring to FIG. 2, the casino gaming system 10*a* may include a first group or network 12*a* of casino gaming units 20 (only one of which is shown) operatively coupled to a network computer 22*a* via a network data link or bus 24*a*. The casino gaming system 10*a* may include a multi-player gaming network 50 that includes a multi-player gaming controller 52, one or more input terminals or control panels 54 and a multi-player gaming display 56 operatively coupled to a multi-player gaming server 58 via a network data link or bus 59. The networks 12*a*, 50 may be operatively coupled to each other via a network or bridge 40*a*, which may comprise, for example, the Internet, a wide area network (WAN), or a local area network (LAN) via a first network link 42*a* and a second network link 46. The network links 42*a*, 46 may be provided as a dedicated hardwired link or a wireless link, and may further be provided as an Ethernet link, low-speed serial link, LAN, WAN, etc. Although the network links 42*a*, 46 are shown as single network links, each network link 42*a*, 46 may comprise multiple data links. The network links 42*a*, 46 may be configured for various communications protocol, such as the Extensible Mark-up Language (XML).

As with the first and second networks 12, 14 described above, the network 12*a* of gaming units 20 may be provided in a first casino at a first geographic location, and the multi-player gaming network 50 may be provided in a second casino located in a separate geographic location. Alternatively, the networks 12*a*, 50 may be provided in the same casino, though remotely from each other such as in different geographic locations including different rooms, different floors, different areas of the same room, etc. The network 40*a* may include a plurality of network computers or server computers (not shown), each of which may be operatively interconnected. Where the bridge 40*a* comprises the Internet, data communication may take place over the communication links 42*a*, 46 via an Internet communication protocol.

The network computer 22*a* may be a server computer or a plurality of server computers including a player tracking server 26. As with the network computer 22 above, the network computer 22*a* may be used to accumulate and analyze data relating to the operation of the gaming units 20. For example, the network computer 22*a* may continuously receive data from each of the gaming units 20 indicative of the dollar amount and number of wagers being made on each of the gaming units 20, data indicative of how much each of the gaming units 20 is paying out in winnings, etc. Using the player tracking server 26, the network computer 22*a* may accumulate, analyze and store data regarding player information including the identity and gaming habits of players playing each of the gaming units 20, wager amounts, number of wagers, player's gaming decisions (e.g., game number selections), etc. and assign a unique player identification to identify the player with the player data.

A player tracking unit 26*a* may also be included in each gaming unit 20 which may read a player's identification when inputted into the gaming unit 20 and request player information from the player tracking server 26. The player tracking server 26 may validate the player's identification, associate the player's identification with any wagers made for a multi-player game and provide the player data to the player tracking unit 26*a*. The player's identification may be associated with a wager on a multi-player game by associating the player identification with a unique ticket identification identifying a ticket issued with a wager on a remote multi-player game. The ticket may include paper or another printable or encodable material. In addition to the ticket identification, the ticket may include the casino name, the name of the multi-player game, the particular multi-player game being wagered on, a validation number, security data and any other information that may be necessary or desirable.

Player tracking units 26*b*, 26*c* may be provided as stand-alone devices, including a kiosk 21 or a handheld device 23. Each may be provided with a display and a control panel to remotely monitor and wager on a remote multi-player game. A handheld device may include any portable electronic device such as a laptop computer, a personal digital assistant, a cellular phone and the like. While the following description will primarily discuss a gaming unit 20 comprising a player tracking unit 26*a*, it should be understood that the functions of the player tracking unit 26*a* may likewise be applied to the player tracking units 26*b*, 26*c*. In many cases, aspects of the gaming unit 20 described below may be applicable to the kiosk 21 and handheld device 23, such as each including a value input device such as a coin slot or acceptor, a paper currency acceptor, a ticket reader/printer and/or a card reader, which may be used to input value to the kiosk 21 or handheld device 23. A value input device may include any device that can accept value from a customer which may also include entering an account number and personal identification number for electronic funds transfer. As used herein, the term "value" may encompass gaming tokens, coins, paper currency, ticket vouchers, credit or debit cards, smart cards, electronic funds and any other object representative of value. However, unlike the gaming unit 20 the kiosk 21 and handheld devices 23 may or may not include routines for video poker, video blackjack, slots, video keno, video bingo or other gaming routines that are executed by the controller 100 described below, but rather be dedicated devices for remotely monitoring and wagering on remote multi-player games.

The bridge 40*a* may be used to facilitate communication between the first network 12*a* and the multi-player gaming network 50. In particular, the bridge 40*a* may transmit queries and requests from the player tracking server 26 to the multi-player gaming server 58. In turn, the multi-player gaming server 58 may provide information in response to the request. The information may relate to wagers a player may have placed at one of the input terminals 54 for a multi-player game, including the number and amount of the wagers, the player's gaming decisions, and the ticket identification. The bridge 40*a* may further be used to act as a translator or intermediary between the two networks 12*a*, 50, if the networks 12*a*, 50 operate using different communication protocols.

The multi-player gaming controller 52 may include a random number generator for randomly selecting game numbers from a range of game numbers. The random number generator may be pseudo-random number generator embodied in a software routine executed by the multi-player gaming controller 52, or the random number generator may be a mechanical instrument such as a rotating drum containing a number of objects, such as balls, each being associated with one of the game numbers from the range of game numbers. The rotation of the drum may randomly shuffle the objects therein such that the selection of any object is random. The multi-player gaming controller 52 may be part of the multi-player gaming server 58 or in some instances may not be used at all. For example, with sports betting, a payout may be based on the sporting event itself and not on a random number generator, though the multi-player gaming controller 52 may be used to calculate the odds on a particular outcome of the sporting event. The odds may be continuously updated based on updated data (e.g., an athlete's health) and displayed as a payout table.

The input terminal 54 may be used by the player as a value input device to place a wager and may be located remotely from the gaming units 20, the kiosks 21, the handheld devices 23 or any other device with a player tracking unit 26*a*, 26*b*, 26*c*, such as in a different floor, a different room, a different area of a room, a different casino, etc. The input terminal 54 may include a coin slot or acceptor, a paper currency acceptor, a ticket reader/printer and a card reader similar to those described below with a gaming unit 20, and which may be used to input value to the input terminal 54. The wager may be on a multi-player game such as a sporting event, a lottery game, etc. The player may use the input terminal 54 to register for a multi-player game using the player identification, designate the amount of the wager, select a sporting event and outcome of the sporting event, or select game numbers from a range of available game numbers for a lottery game. For example, the lottery game may have game numbers ranging from 1-100. The player may select a plurality of game numbers from the range of game numbers or predict an outcome of a sporting event using the input terminal 54 prior to the start of a sporting event or the drawing of a lottery game. The quantity of selected game numbers may be dependent on the amount of the wager and the particular lottery rules being used. In one example, the multi-player gaming controller 52 may randomly select the game numbers or sporting event outcome on behalf of the player. The selected game numbers or selected sporting event outcome may be printed on a ticket and dispensed by the input terminal 54, along with a ticket identification assigned by the multi-player gaming server 58 to identify the wager. In some cases, the player may place a wager with an attendant who would enter the player's gaming decisions (e.g., game numbers selections) into the input terminal, enter the wager and provide the player with a ticket. A card reader, similar to the card reader 64 described below, may be used to encode the player's registration, the wager, the player's gaming decisions and the ticket identification on a player identification device. The input terminal 54 may include a processor and a memory to compare the results of the multi-player game (e.g., the randomly selected numbers or the outcome of the sporting event) to the gaming decisions by the player and determine a payout.

The multi-player gaming display 56 may be used to display multi-player gaming information regarding the sporting event or lottery game being wagered on. For a sporting event, the multi-player gaming display 56 may include a video image of the status of the sporting event (e.g., a score) and the final outcome of the sporting event. The multi-player gaming display 56 may further include a real-time or near real-time video of the actual sporting event. For a lottery game, the multi-player gaming display 56 may include a video image of a plurality of game numbers in a grid pattern representing the range of game numbers for the lottery game. The multi-player gaming display 56 may further display the randomly-selected game numbers by highlighting the randomly-selected game numbers from among the range of game numbers or otherwise distinguish the randomly-selected numbers from the range of game numbers. For example, the randomly-selected game numbers 12, 36, 52, 58, 76, and 82 have been highlighted on the multi-player gaming display 56 to be distinguished from the remaining game numbers. The multi-player gaming display 56 may be located near an input terminal 54 and remotely from the gaming units 20, such as in a different floor, a different room, a different area of a room, a different casino, etc.

The multi-player gaming server 58 may be a network server computer associated with a game played on the multi-player gaming network 50. For example, the multi-player gaming server 58 may be a keno or other lottery server, a sports betting server, etc. and may be used to perform the same or different functions in relation to the gaming units 30 as the network computer 22 described above. The multi-player gaming server 58 may be used in relation to a single multi-player game, such as a lottery game where multiple players wager on the same lottery game, or a sporting event where multiple players wager on the outcome of the same sporting event. The multi-player gaming server 58 may be used to associate a ticket identification with a player's wager including a player's gaming decisions (e.g., selection of game numbers or sporting event outcome) following the player's wager and registration at an input terminal 54. The ticket identification may be a form of indicia or encoding, including an alphanumeric code, a barcode, a magnetic code, an optical code, a watermark, an electronic code embedded in a memory chip, etc. The player's gaming decisions may be represented on a ticket held by the player, and the ticket identification may be encoded on the ticket, including printing the ticket identification on the ticket. A player tracking device, such as a player tracking card, may encode this information on the player tracking device. The multi-player gaming server 58 may further be used to track the ticket via the ticket identification, including verification of the ticket if the player redeems the ticket to receive a payout. Using the ticket identification, the multi-player gaming server 58 may identify which tickets include game numbers that match a sufficient number of the randomly selected game numbers to merit a payout. However, this may also be performed by the input terminal 54 or in conjunction with the input terminal 54 where the input terminal dispenses a payout or credits the player's account with the payout. The amount of the payout may be dependent on the number of matches between the game numbers selected by the player and the randomly-selected game numbers. The multiplayer gaming server 58 may also associate the ticket identification, wager information, etc. with the player identification from the registration process.

Although the first network 12*a* is shown to include one server 22*a* with one player tracking server 26, one gaming unit 20 with a player tracking unit 26*a*, one kiosk 21 with a player tracking unit 26*b* and one handheld device 26*c*, it should be understood that different numbers of servers, player tracking servers, gaming units, kiosks, handheld devices and player tracking units may be utilized. For example, the network 12*a* may include a plurality of tracking servers 26 and tens or hundreds of gaming units 20, kiosks and handheld devices, some or all of which may have a player tracking unit 26*a*, 26*b*, 26*c*, and all of which may be interconnected via the data link 42*a*. Likewise, the multi-player gaming network 50 may include different numbers of multi-player gaming controllers 52, input terminals 54, display screens 56, and multi-player gaming servers 58.

Figure 3:
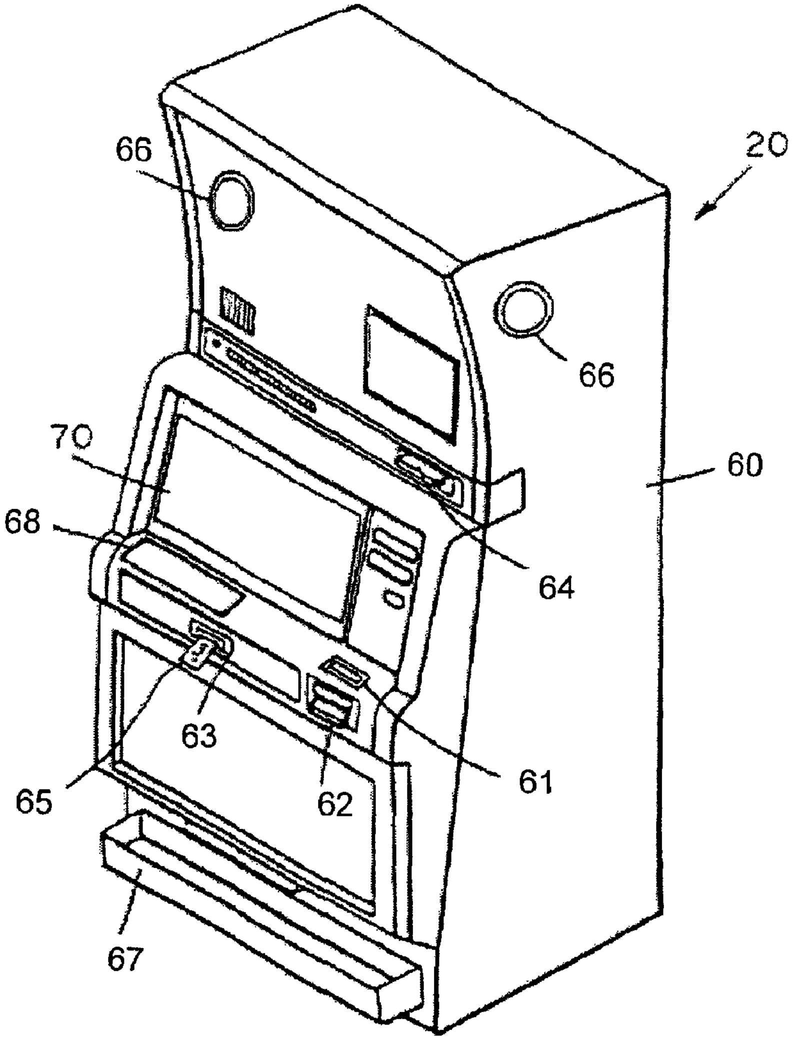
FIG. 3 is a perspective view of an embodiment of one of the gaming units shown schematically in FIGS. 1 and 2.

FIG. 3 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 3, the casino gaming unit 20 may include a housing or cabinet 60 and one or more input devices, which may include a coin slot or acceptor 61, a paper currency acceptor 62, a ticket reader/printer 63 and a card reader 64, which may be used to input value to the gaming unit 20. If provided on the gaming unit 20, the ticket reader/printer 63 may be used to read and/or print or otherwise encode ticket vouchers 65. The ticket vouchers 65 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 65 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 65 could be printed with an optically readable material such as ink, or data on the ticket vouchers 65 could be magnetically encoded. The ticket reader/printer 63 may be provided with the ability to both read and print ticket vouchers 65, or it may be provided with the ability to only read or only print or encode ticket vouchers 65. In the latter case, for example, some of the gaming units 20 may have ticket printers 63 that may be used to print ticket vouchers 65, which could then be used by a player in other gaming units 20 that have ticket readers 63.

If provided, the card reader 64 may include any type of card reading device, such as a magnetic card reader or an optical card reader, and may be used to read data from a card offered by a player, such as a credit card or a player tracking card. If provided for player tracking purposes, the card reader 64 may be used to read data from, and/or write data to, player tracking cards that are capable of storing data representing the identity of a player, the identity of a casino, the player's gaming habits, etc.

The gaming unit 20 may include one or more audio speakers 66, a coin payout tray 67, an input control panel 68, and a color video display unit 70 for displaying images relating to the game or games provided by the gaming unit 20. The audio speakers 66 may generate audio representing sounds such as the noise of spinning slot machine reels, a dealer's voice, music, announcements or any other audio related to a casino game. The input control panel 68 may be provided with a plurality of pushbuttons or touch-sensitive areas that may be pressed by a player to select games, make wagers, make gaming decisions, etc.

Figure 3A:
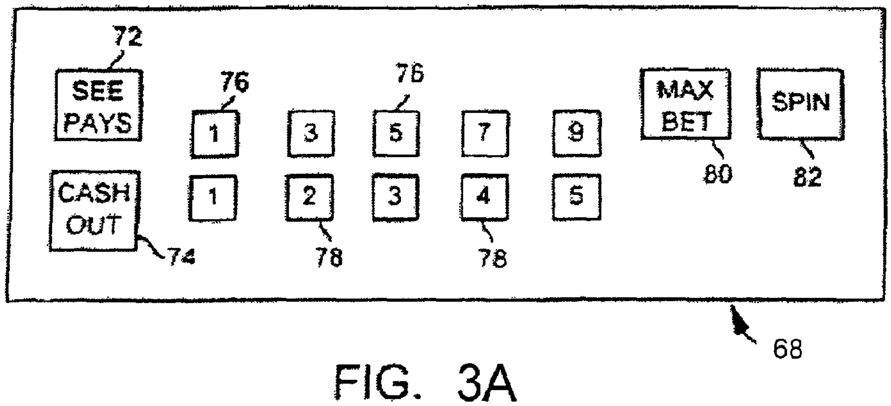
FIG. 3A illustrates an embodiment of a control panel for a gaming unit.

FIG. 3A illustrates one possible embodiment of the control panel 68, which may be used where the gaming unit 20 is a slot machine having a plurality of mechanical or "virtual" reels. Referring to FIG. 3A, the control panel 68 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 68 may include a "Cash Out" button 74 that may be activated when a player decides to terminate play on the gaming unit 20, in which case the gaming unit 20 may return value to the player, such as by returning a number of coins to the player via the payout tray 67.

If the gaming unit 20 provides a slots game having a plurality of reels and a plurality of paylines which define winning combinations of reel symbols, the control panel 68 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 68 may be provided with a plurality of selection buttons 78 each of which allows a player to specify a wager amount for each pay line selected. For example, if the smallest wager accepted by the gaming unit 20 is a quarter ($0.25), the gaming unit 20 may be provided with five selection buttons 78, each of which may allow a player to select one, two, three, four or five quarters to wager for each pay line selected. In that case, if a player were to activate the "5" button 76 (meaning that five paylines were to be played on the next spin of the reels) and then activate the "3" button 78 (meaning that three coins per pay line were to be wagered), the total wager would be $3.75 (assuming the minimum bet was $0.25).

The control panel 68 may include a "Max Bet" button 80 to allow a player to make the maximum wager allowable for a game. In the above example, where up to nine paylines were provided and up to five quarters could be wagered for each pay line selected, the maximum wager would be 45 quarters, or $11.25. The control panel 68 may include a spin button 82 to allow the player to initiate spinning of the reels of a slots game after a wager has been made.

In FIG. 3A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 60 of the gaming unit 20 is required, and the term "control panel" may encompass a plurality or grouping of player activatable buttons.

Although one possible control panel 68 is described above, it should be understood that different buttons could be utilized in the control panel 68, and that the particular buttons used may depend on the game or games that could be played on the gaming unit 20. Although the control panel 68 is shown to be separate from the display unit 70, it should be understood that the control panel 68 could be generated by the display unit 70. In that case, each of the buttons of the control panel 68 could be a colored area generated by the display unit 70, and some type of mechanism may be associated with the display unit 70 to detect when each of the buttons was touched, such as a touch-sensitive screen.

Gaming Unit Electronics

Figure 4:
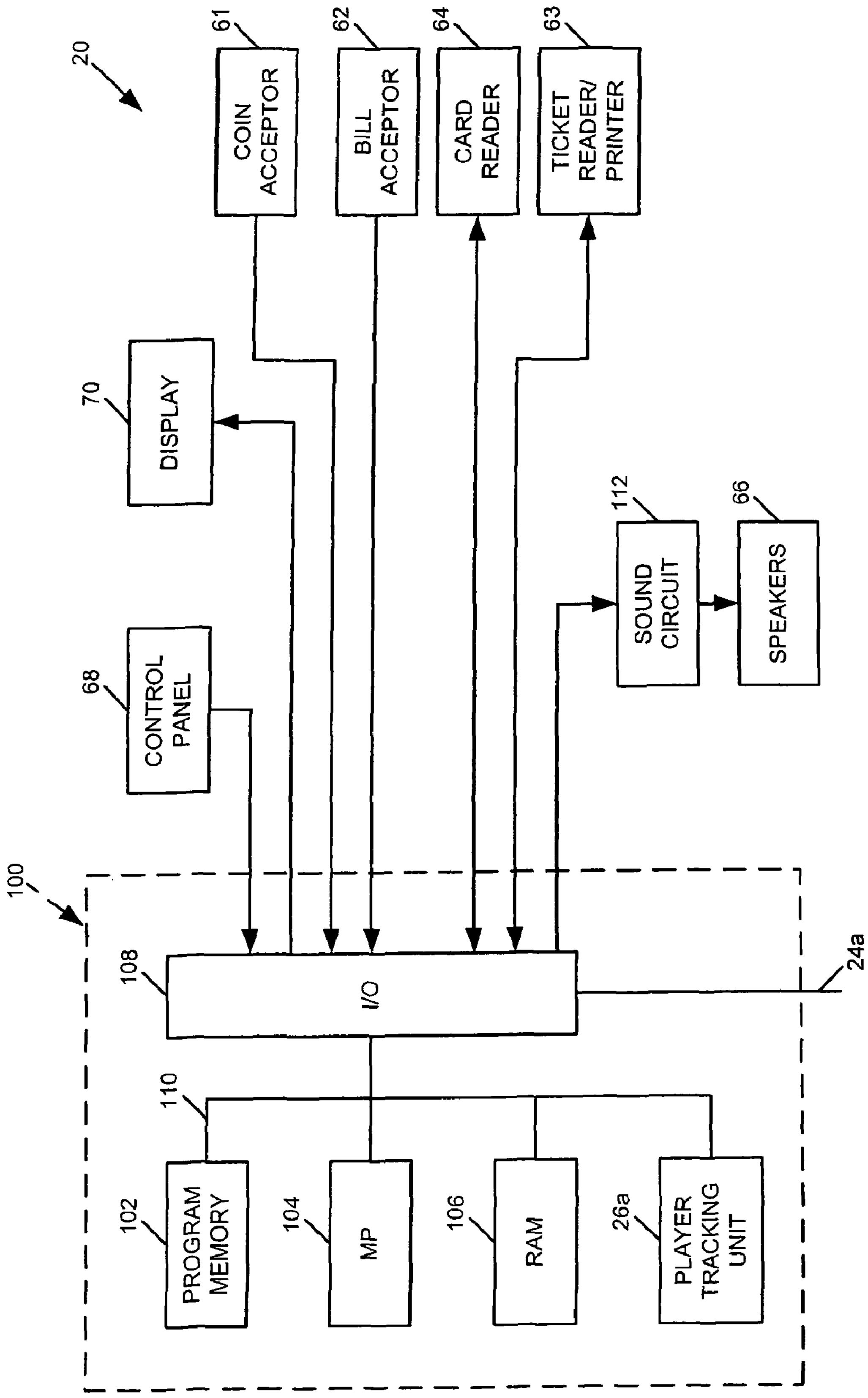
FIG. 4 is a block diagram of the electronic components of the gaming unit of FIG. 3.

FIG. 4 is a block diagram of a number of components that may be incorporated in the gaming unit 20. However, as mentioned above, many aspects of the gaming unit 20 may be included in the kiosk 21 and handheld devices 23. The following description of the controller 100 electronics may be equally applicable to the kiosk 21 and handheld device 23, as will be recognized by those or ordinary skill in the art. Referring to FIG. 4, the gaming unit 20 may include a controller 100 that may comprise the player tracking unit 26*a*, a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 4 as a read-only memory (ROM) 102, the program memory of the controller 100 may be a read/write or alterable memory, such as a hard disk. In the event a hard disk is used as a program memory, the address/data bus 110 shown schematically in FIG. 4 may comprise multiple address/data buses, which may be of different types, and there may be an I/O circuit disposed between the address/data buses.

FIG. 4 illustrates that the control panel 68, the coin acceptor 61, the bill acceptor 62, the card reader 64 and the ticket reader/printer 63 may be operatively coupled to the I/O circuit 108, each of those components being so coupled by either a unidirectional or bidirectional, single-line or multiple-line data link, which may depend on the design of the component that is used. The speaker(s) 66 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 4, the components 61, 62, 63, 64, 68, 112 may be connected to the I/O circuit 108 via a respective direct line or conductor. Different connection schemes could be used. For example, one or more of the components shown in FIG. 4 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. Additionally, the computer program(s) or portions thereof may control the operation of the multi-player gaming server 58 and an input terminal 54 from a remote location such as the gaming unit 20, a kiosk 21 or handheld device 23. Such remote control may be facilitated with the use of a wireless connection, or my an Internet interface that connects the player tracking unit 26*a* (or the player tracking units 26*b*, 26*c*) with the multi-player gaming server 58, the input terminal 54 or the multi-player gaming network 50 generally. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 5:
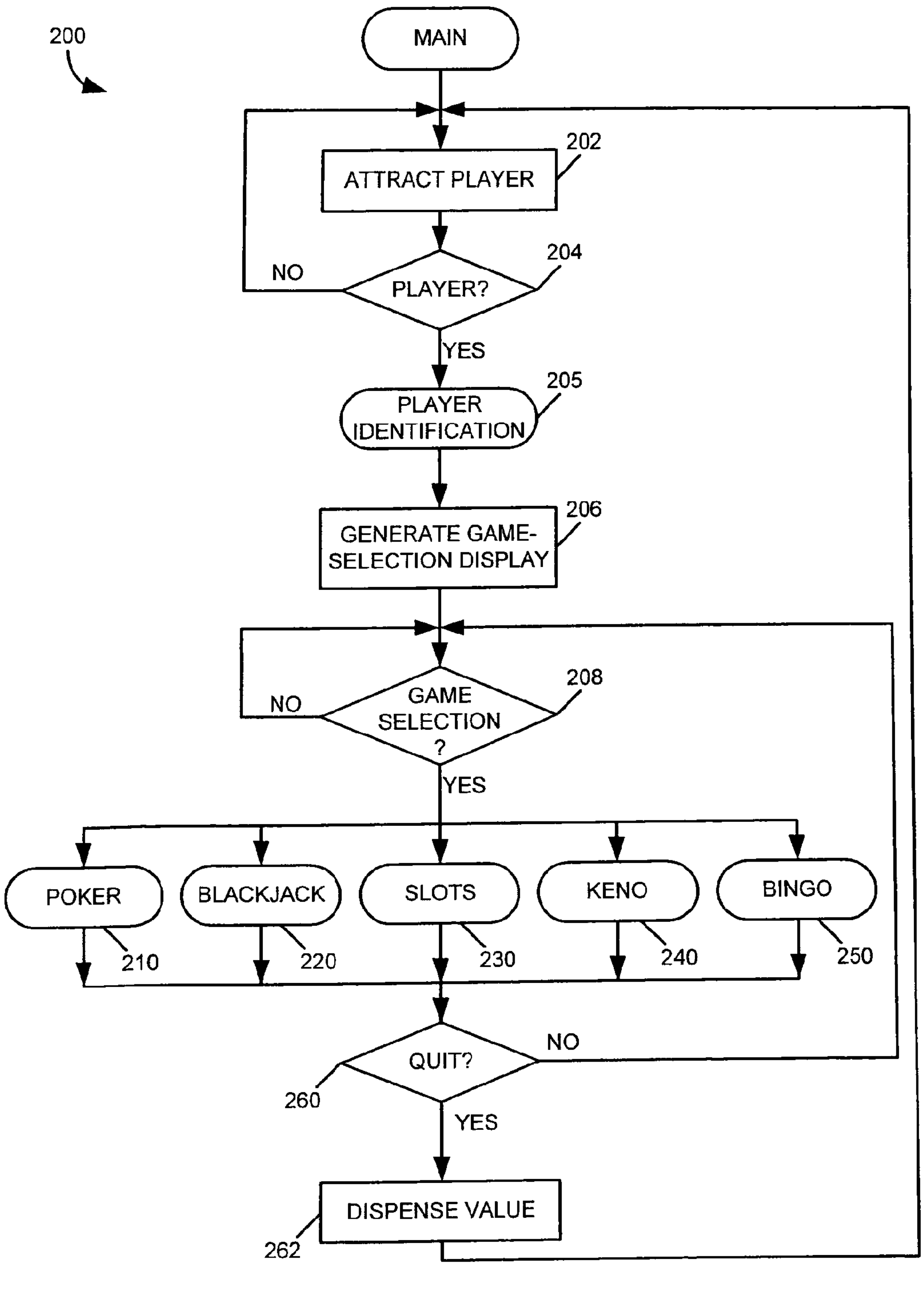
FIG. 5 is a flowchart of an embodiment of a main routine that may be performed during operation of one or more of the gaming units.

FIG. 5 is a flowchart of a main operating routine 200 that may be stored in the memory of the controller 100. Referring to FIG. 5, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 66. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a player identification routine may be initiated at block 205 to identify the player, retrieve player information from the player tracking server 26 and determine if a remote multi-player game should be displayed and controlled from the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The player identification routine 205 may prompt the player to enter the player identification by inserting a player tracking card into the card reader 64, entering the player identification using the control panel 68 or otherwise reading the player's identification from the player identification device. The player identification routine 205 may prompt the player tracking unit **26*a* to request player information from the player tracking server 26 including remote multi-player gaming information. Following the player identification routine 205, a game-selection display may be generated on the display unit 70 at block 206 to allow the player to select a game available on the gaming unit 20**.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. The game routines may be single-player games playable by only one player at a time, which may be the player positioned at the gaming unit 20. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 5, a different number of routines could be included to allow play of a different number of games. The gaming unit 20 may also be programmed to allow play of different games.

Figure 6:
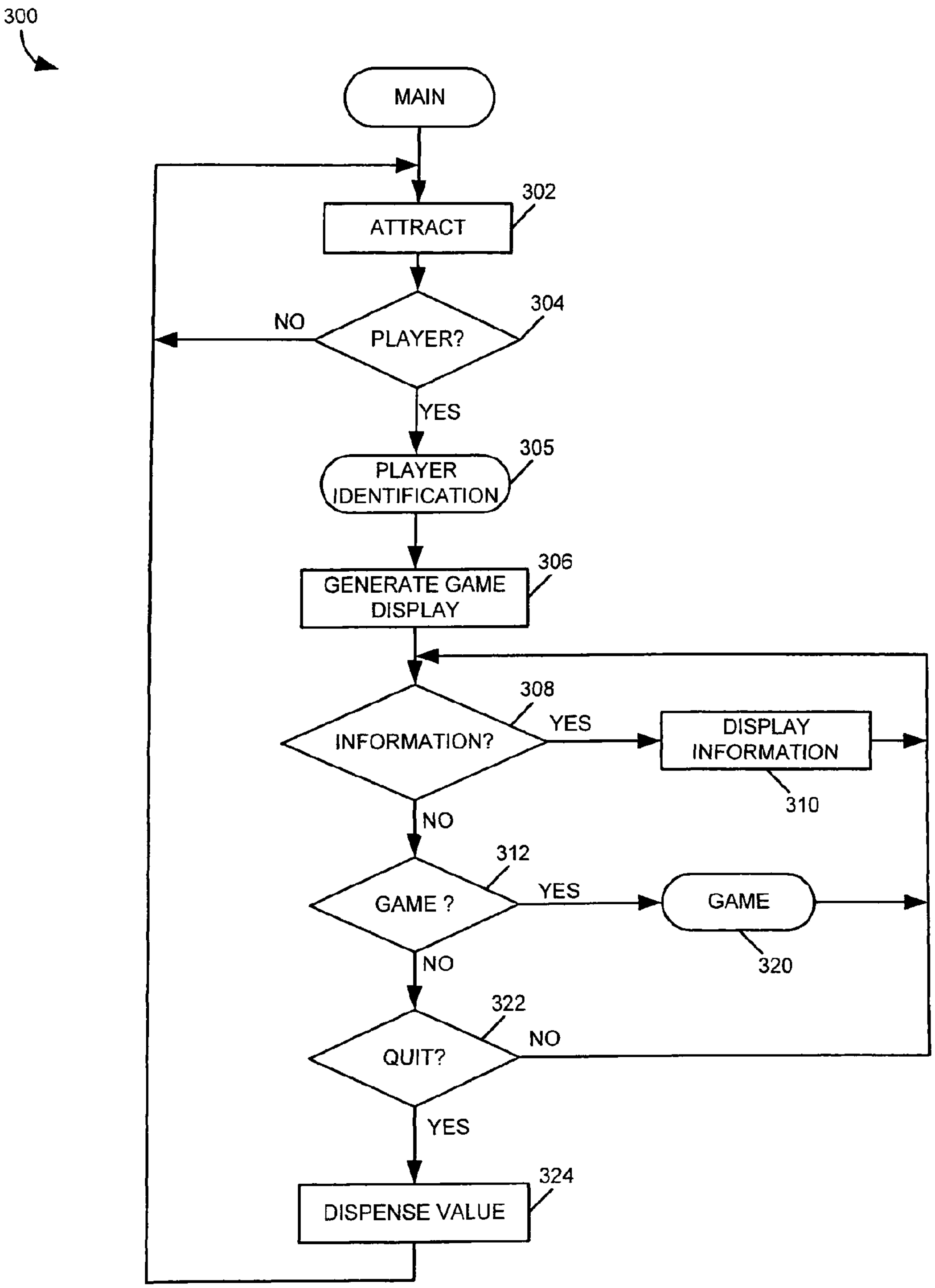
FIG. 6 is a flowchart of an alternative embodiment of a main routine that may be performed during operation of one or more of the gaming units.

FIG. 6 is a flowchart of an alternative main operating routine 300 that may be stored in the memory of the controller 100. The main routine 300 may be utilized for gaming units 20 that are designed to allow play of only a single game or single type of game. Referring to FIG. 6, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 66. During performance of the attraction sequence, if a potential player makes any input to the gaming unit 20 as determined at block 304, the attraction sequence may be terminated and a player identification routine may be initiated at block 305.

The player identification routine 305 may prompt the player to enter the player identification by inserting a player tracking card into the card reader 64, entering the player identification using the control panel 68 or otherwise reading the player's identification from the player identification device. The player identification routine 205 may prompt the player tracking unit **26*a* to request player information from the player tracking server 26 including remote multi-player gaming information. Following the player identification routine 305, a game-selection display may be generated on the display unit 70 at block 306**.

The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 7:
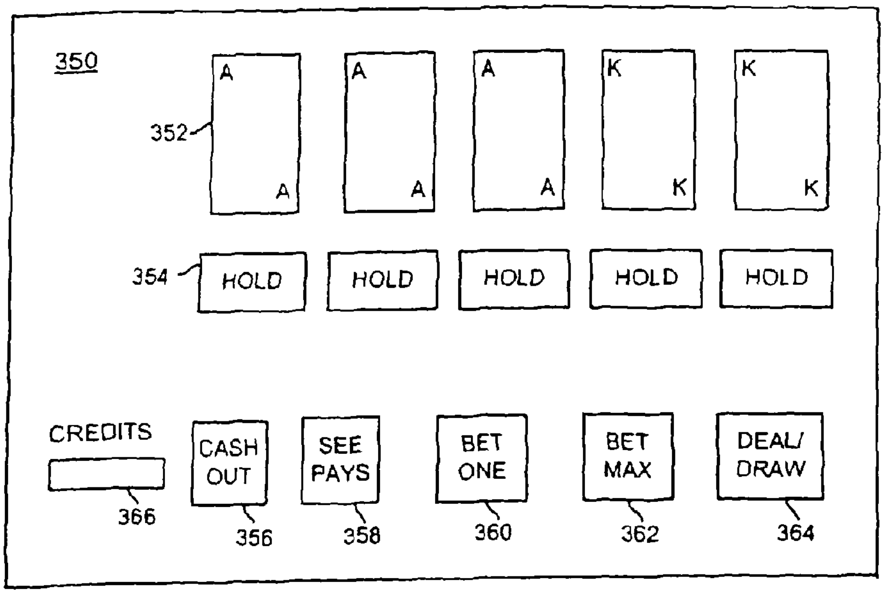
FIG. 7 is an illustration of an embodiment of a visual display that may be displayed during performance of the video poker routine of FIG. 9.

FIG. 7 is an exemplary display 350 that may be shown on the display unit 70 during performance of the video poker routine 210 shown schematically in FIG. 5. Referring to FIG. 7, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 9:
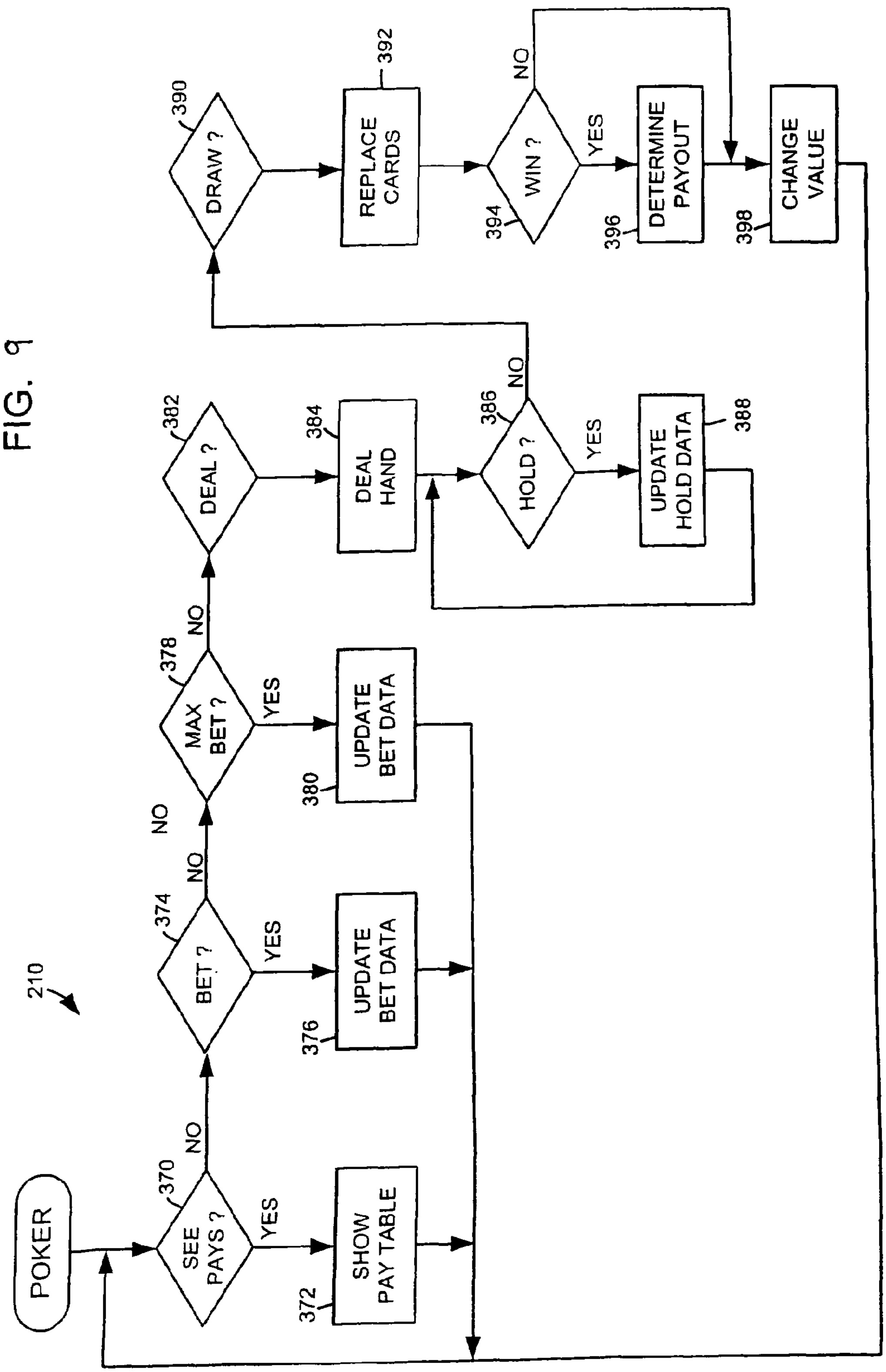
FIG. 9 is a flowchart of an embodiment of a video poker routine that may be performed by one or more of the gaming units.

FIG. 9 is a flowchart of the video poker routine 210 shown schematically in FIG. 5. Referring to FIG. 9, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 7).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 8:
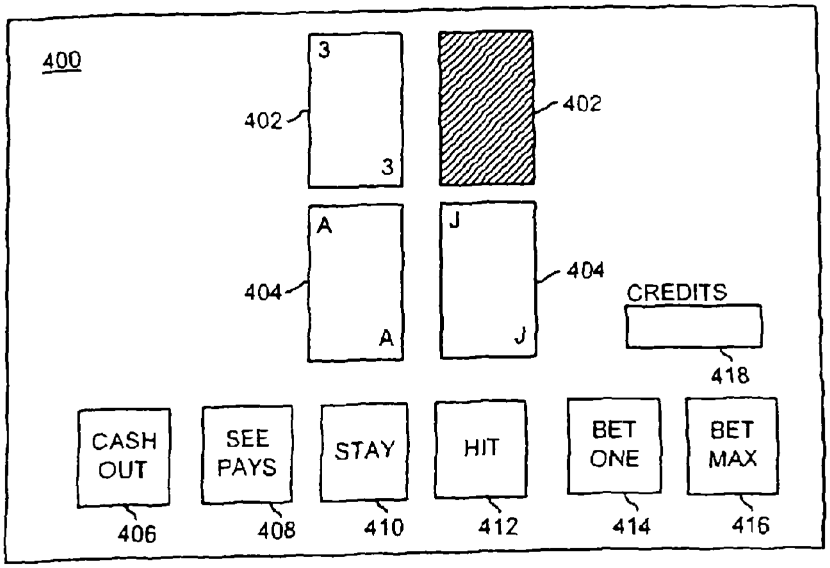
FIG. 8 is an illustration of an embodiment of a visual display that may be displayed during performance of the video blackjack routine of FIG. 10.

FIG. 8 is an exemplary display 400 that may be shown on the display unit 70 during performance of the video blackjack routine 220 shown schematically in FIG. 5. Referring to FIG. 8, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 10:
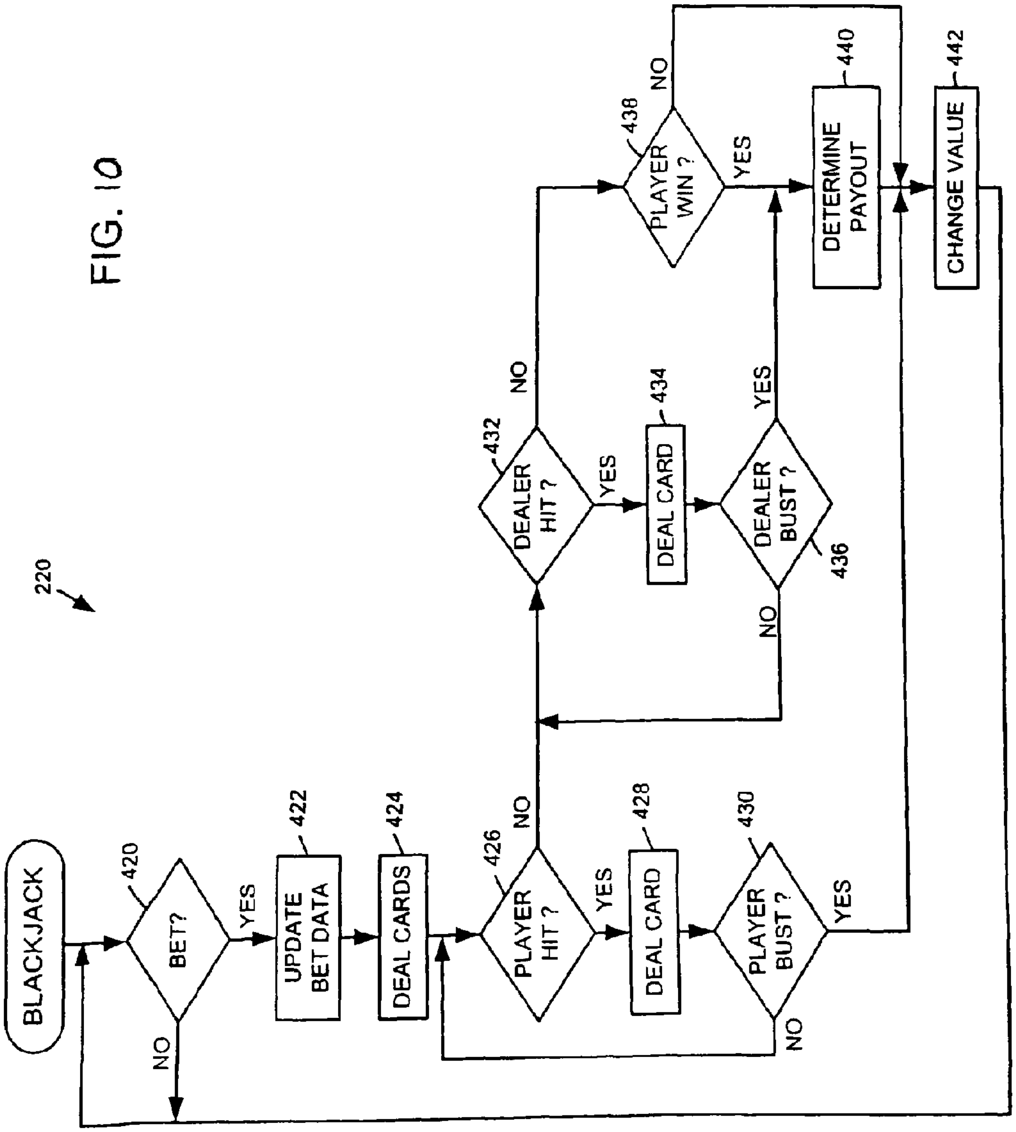
FIG. 10 is a flowchart of an embodiment of a video blackjack routine that may be performed by one or more of the gaming units.

FIG. 10 is a flowchart of the video blackjack routine 220 shown schematically in FIG. 5. Referring to FIG. 10, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 8).

Slots

FIG. 11 is an exemplary display 450 that may be shown on the display unit 70 during performance of the slots routine 230 shown schematically in FIG. 5. Referring to FIG. 11, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of pay line-selection buttons 460 each of which allows the player to select a different number of paylines prior to "spinning" the reels, a plurality of bet-selection buttons 462 each of which allows a player to specify a wager amount for each pay line selected, a "Spin" button 464, and a "Max Bet" button 466 to allow a player to make the maximum wager allowable.

Figure 13:
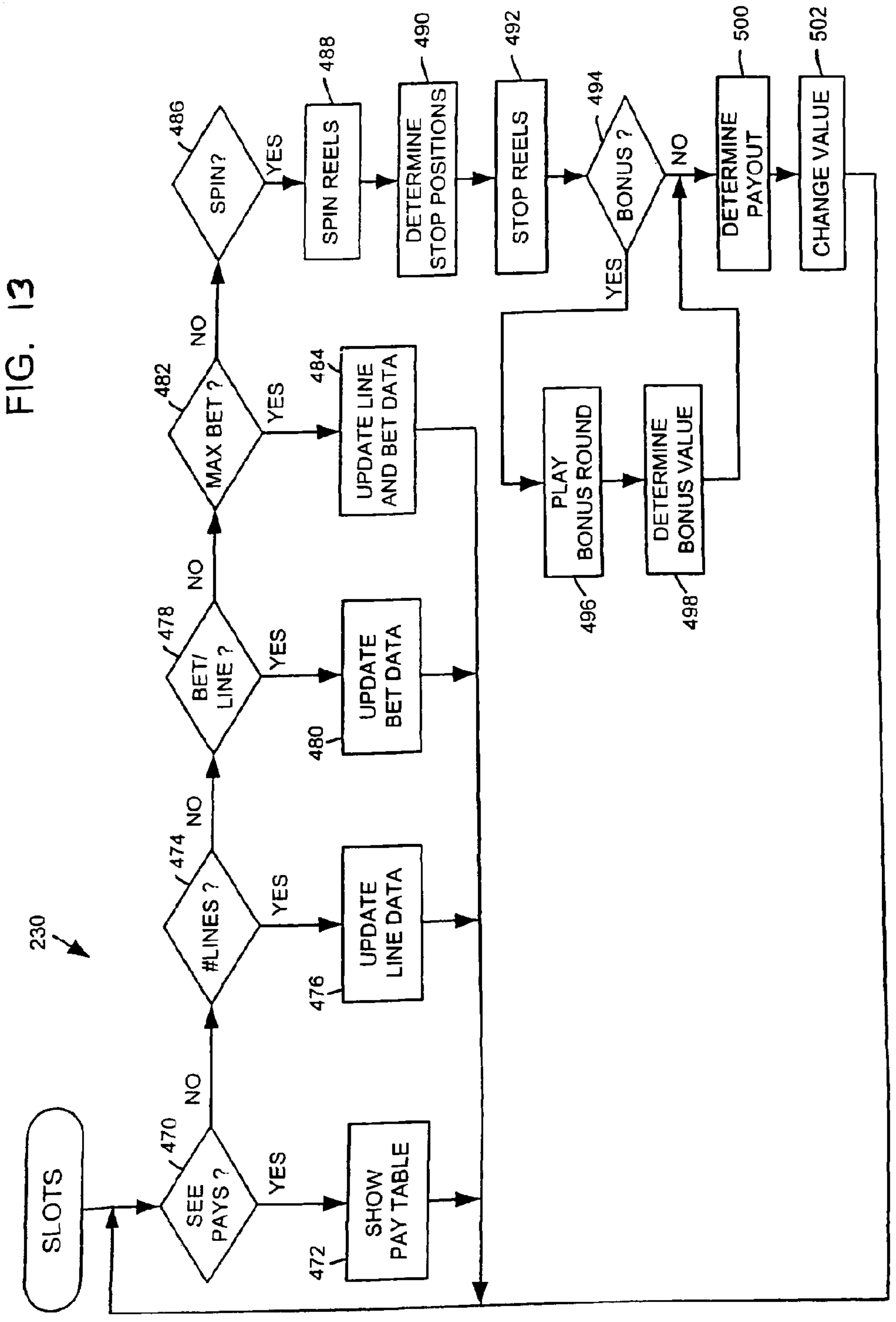
FIG. 13 is a flowchart of an embodiment of a slots routine that may be performed by one or more of the gaming units.

FIG. 13 is a flowchart of the slots routine 230 shown schematically in FIG. 11. Referring to FIG. 13, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the pay line-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per pay line may be stored in the memory of the controller 100. At block 482, the routine may determine whether the player has pressed the "Max Bet" button 466, in which case at block 484 bet data (which may include both pay line data and bet-per-pay line data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 12 is an exemplary display 520 that may be shown on the display unit 70 during performance of the video keno routine 240 shown schematically in FIG. 5. Referring to FIG. 12, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 14:
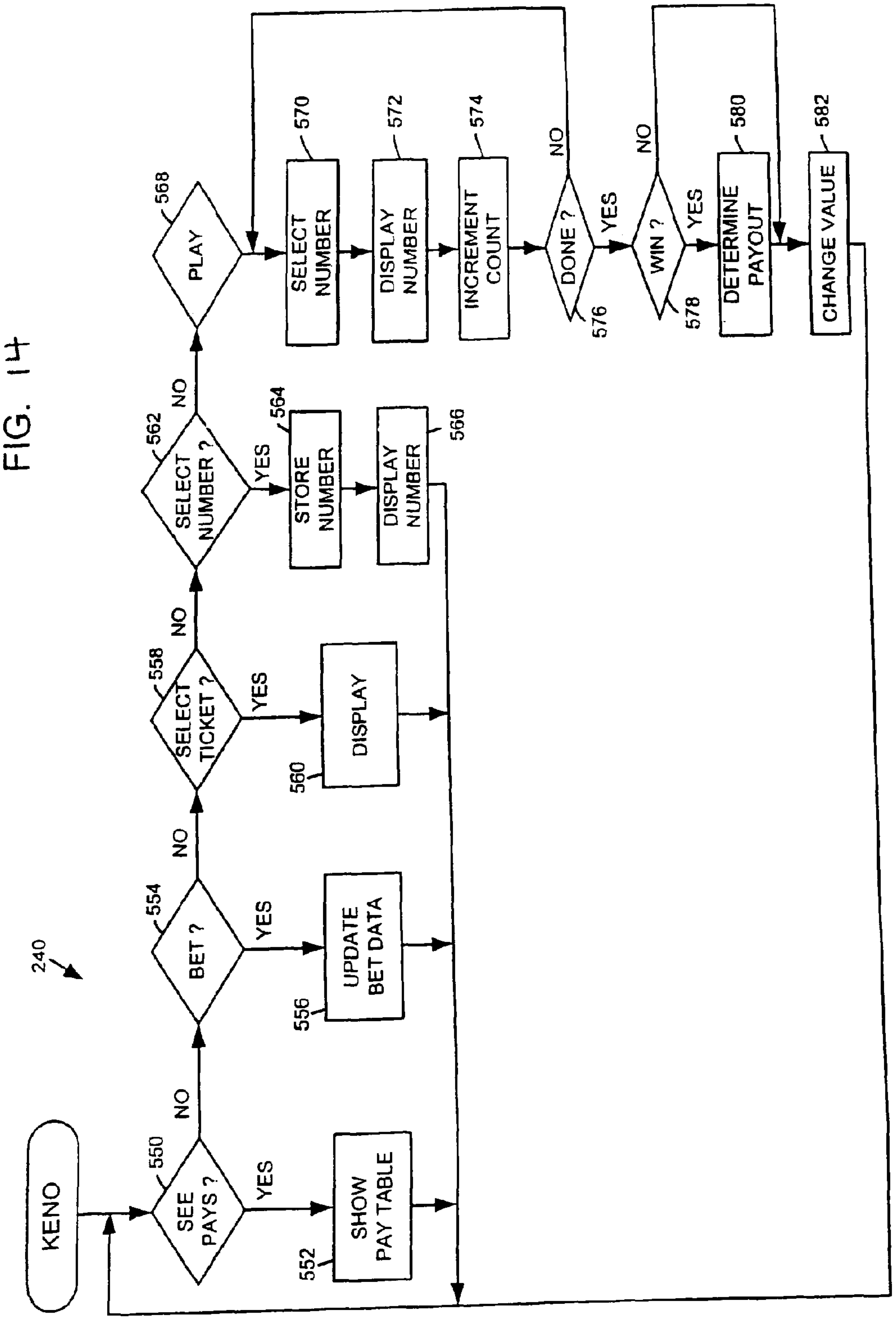
FIG. 14 is a flowchart of an embodiment of a video keno routine that may be performed by one or more of the gaming units.

FIG. 14 is a flowchart of the video keno routine 240 shown schematically in FIG. 5. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 14, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 12).

Video Bingo

Figure 15:
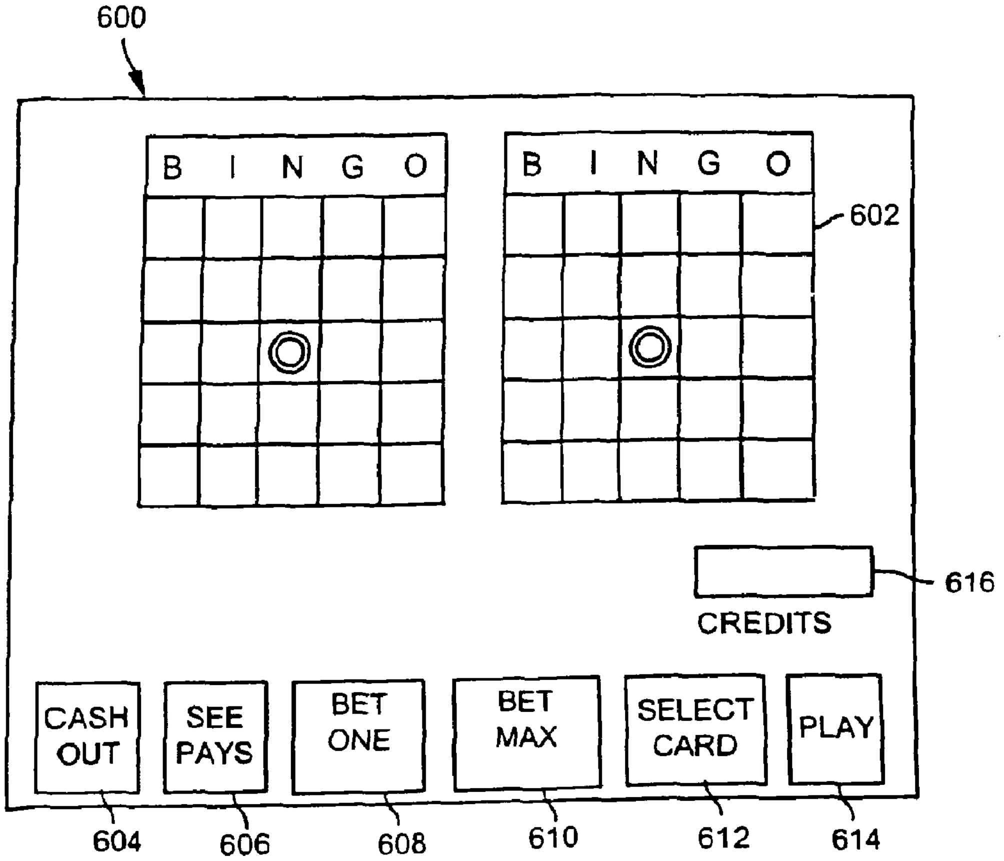
FIG. 15 is an illustration of an embodiment of a visual display that may be displayed during performance of the video bingo routine of FIG. 16.

FIG. 15 is an exemplary display 600 that may be shown on the display unit 70 during performance of the video bingo routine 250 shown schematically in FIG. 5. Referring to FIG. 15, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 16:
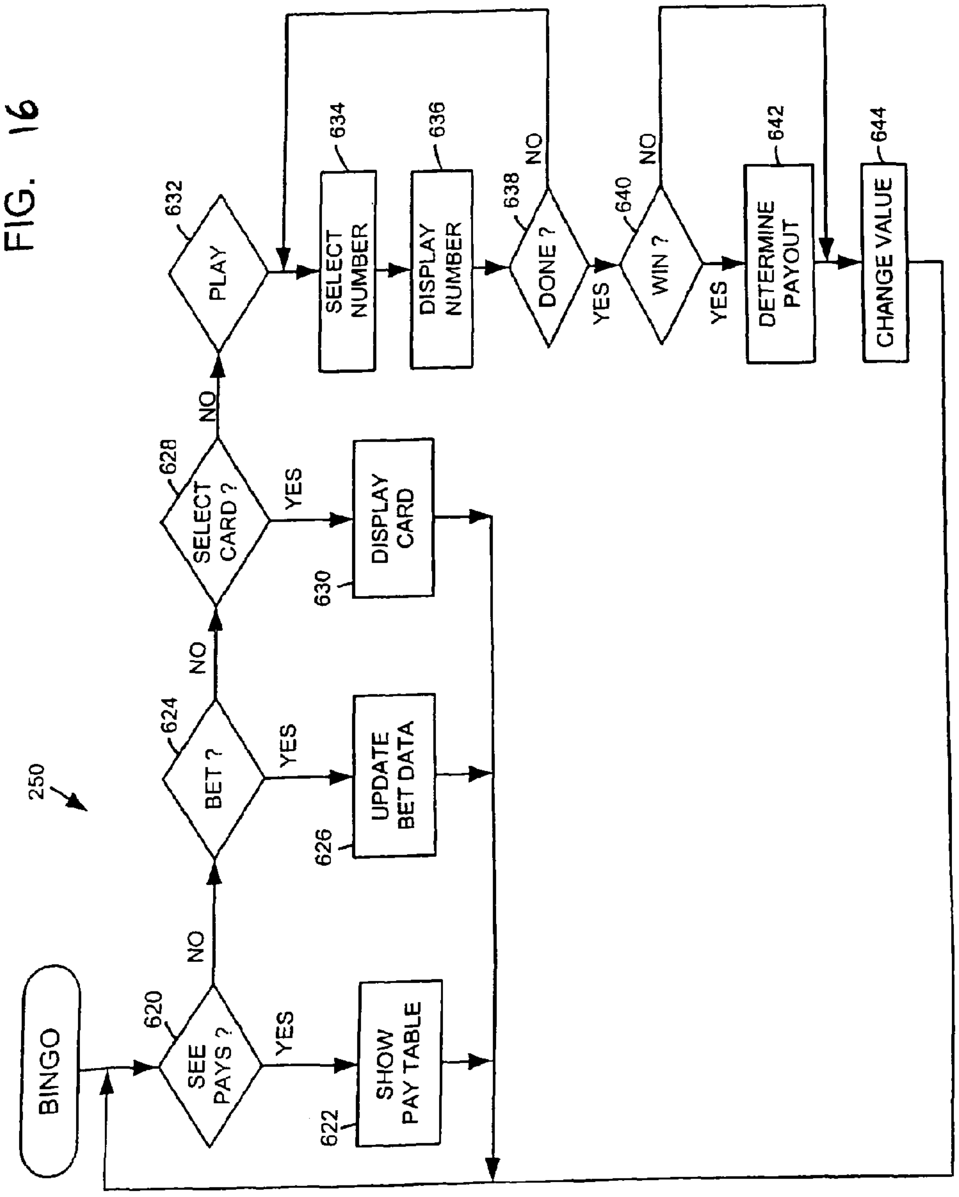
FIG. 16 is a flowchart of an embodiment of a video bingo routine that may be performed by one or more of the gaming units.

FIG. 16 is a flowchart of the video bingo routine 250 shown schematically in FIG. 5. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 16, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 15).

Player Identification

Figure 17:
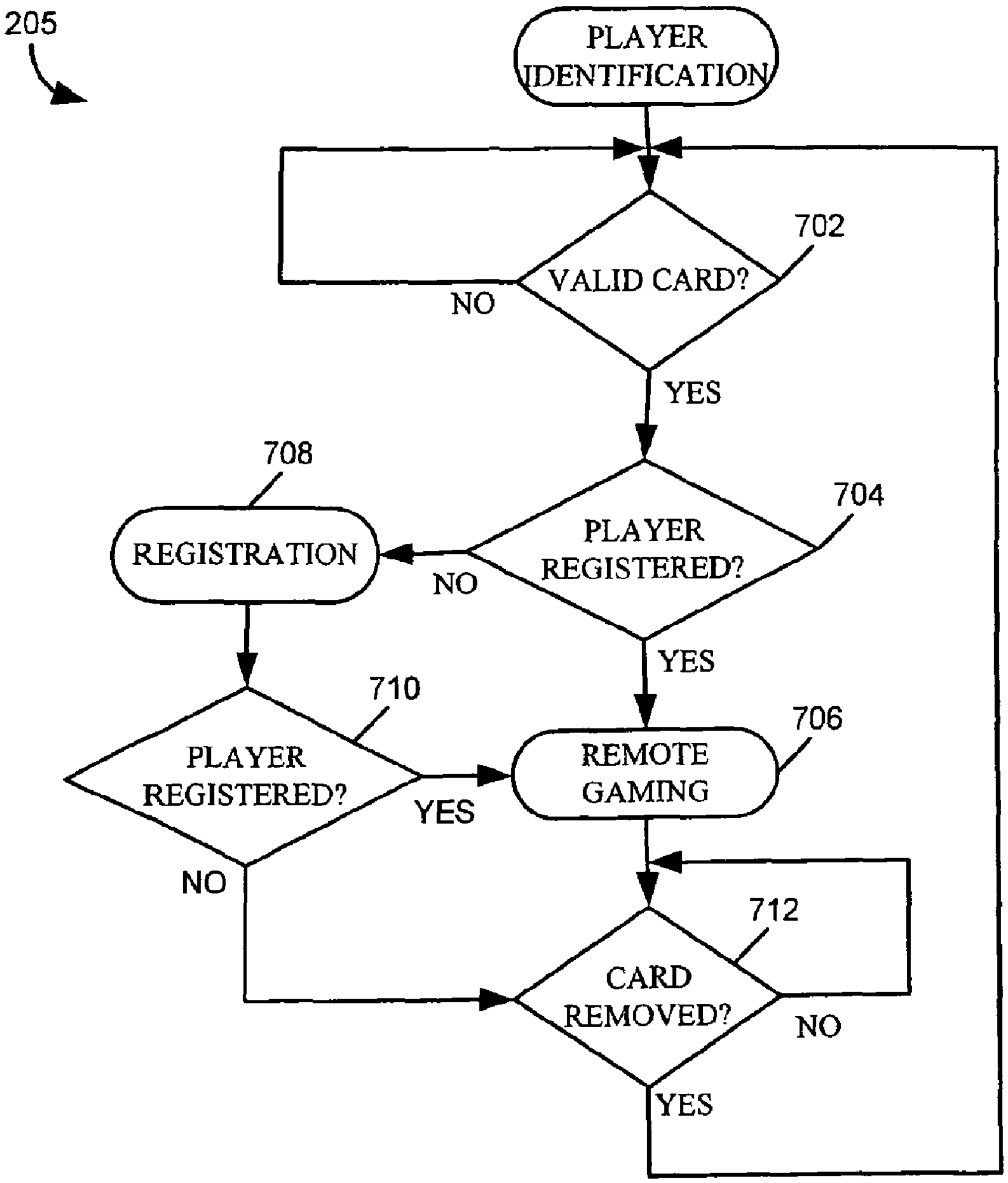
FIG. 17 is a flowchart of an embodiment of a player tracking routine that may be performed during operation of one or more of the gaming units.

FIG. 17 is a flowchart of a player identification routine 205 shown schematically in FIG. 5 and may be used to determine whether to display the remote multi-player game and allow the player to control the remote multi-player game from the gaming unit 20. The following description of the player identification routine 205 may likewise be applied to the player identification routine 305 of FIG. 6. The player identification routine 205 may be stored in a memory of the controller 100 and executed by the player tracking unit 26*a*. Referring to FIG. 17, the player identification routine 205 may begin operation at block 702 during which a player's identification may be validated. The player identification routine 205 may cause the player tracking unit 26*a* to issue a request to the player tracking server 26 to compare the player's identification to a list of player identifications stored by the player tracking server 26. The player tracking server 26 may transmit a result to the player tracking unit 26*a* as to whether the player identification matches one of those stored by the player tracking server 26. The player's identification may be encoded on a player identification device which may be in the form of a player tracking card such as a magnetic or optical card including credit cards or a card issued by a casino through a gaming unit 20, an input terminal, an attendant, etc. The player identification device may also be a radio-wave device such as a memory device coupled with a transceiver worn or carried by the player, or other wireless devices including cellular phones, personal digital assistants, etc. The player's identification may be the player identification as assigned by the player tracking server 26 which may be a unique alphanumeric code, a binary code, etc. The player identification may also be the player's name, credit card number, social security number, etc. The player identification may be read by the gaming unit 20 using an identification reader such as radio transceiver, optical transceiver, card reader 64, control panel 68, or any other device capable of reading player identification information encoded on the player identification device. The player may also enter the player identification using the control panel 68. If the player identification does not match one of those stored by the player tracking server 26, control may loop back to recheck the player identification or the player identification device may be rejected by the gaming unit 20. If the player identification is valid, control may pass to block 704.

Once the player identification is validated at block 702, the player identification routine 205 may determine if the player has registered at an input terminal 54 as a player of a remote multi-player game such as a sporting event or lottery game at block 704. The identification routine 205 may determine if the player is registered by determining whether the player has made a wager on a sporting event or lottery game using the input terminal 54. The player tracking unit 26*a* may submit a request with the player identification, as read at block 702, to the player tracking server 26 to retrieve registration information. The player tracking server 26 may in turn submit a request to the multi-player gaming server 58 via the bridge 40*a* to see if the player has registered for a remote multi-player game at one of the input terminals 54. The player may also be prompted to input a ticket into the ticket reader 64 which may read the ticket identification. The player tracking unit 26*a*, player tracking server 26, and multi-player gaming server 58 may use the ticket identification to search for matching registration profiles. If the player identification is associated with a registration profile as kept by the multi-player gaming server 58, control may pass to block 706 to display the remote multi-player game and display options for the player.

If the player is not registered as determined at block 704, control may pass to a registration routine at block 708 to register the player for a remote multi-player game. Following the registration routine 708, the player identification routine 205 may again determine whether the player is registered as a player of a remote multi-player game at block 710. If the player is not registered, control may pass to block 712 for the player tracking card to be removed or for the gaming unit 20 to prompt the player with a visual message to remove the player tracking card, log off the gaming unit 20 or otherwise disengage from the gaming unit 20. The player identification routine 205 may continue to loop until the card or player identification is removed. Once the card is removed, as determined at block 712, control may pass back to block 702 to validate another player identification. Alternatively, the player may be allowed to continue playing a game on the gaming unit 20 such as the video poker routine 210, the video blackjack routine 220, the slots routine 230, the video keno routine 240 and the video bingo routine 250.

If the player identification routine 205 determines that the player registered for a remote multi-player game either at block 704 or block 710, control may pass to a remote gaming routine at block 706 for display of the remote multi-player game and options for controlling regarding the remote multi-player game. Following the remote gaming routine 706, control may pass to block 712 for the card to be removed or the player may be allowed to continue with one of the gaming routines 210, 220, 230, 240, 250.

Registration

Figure 18:
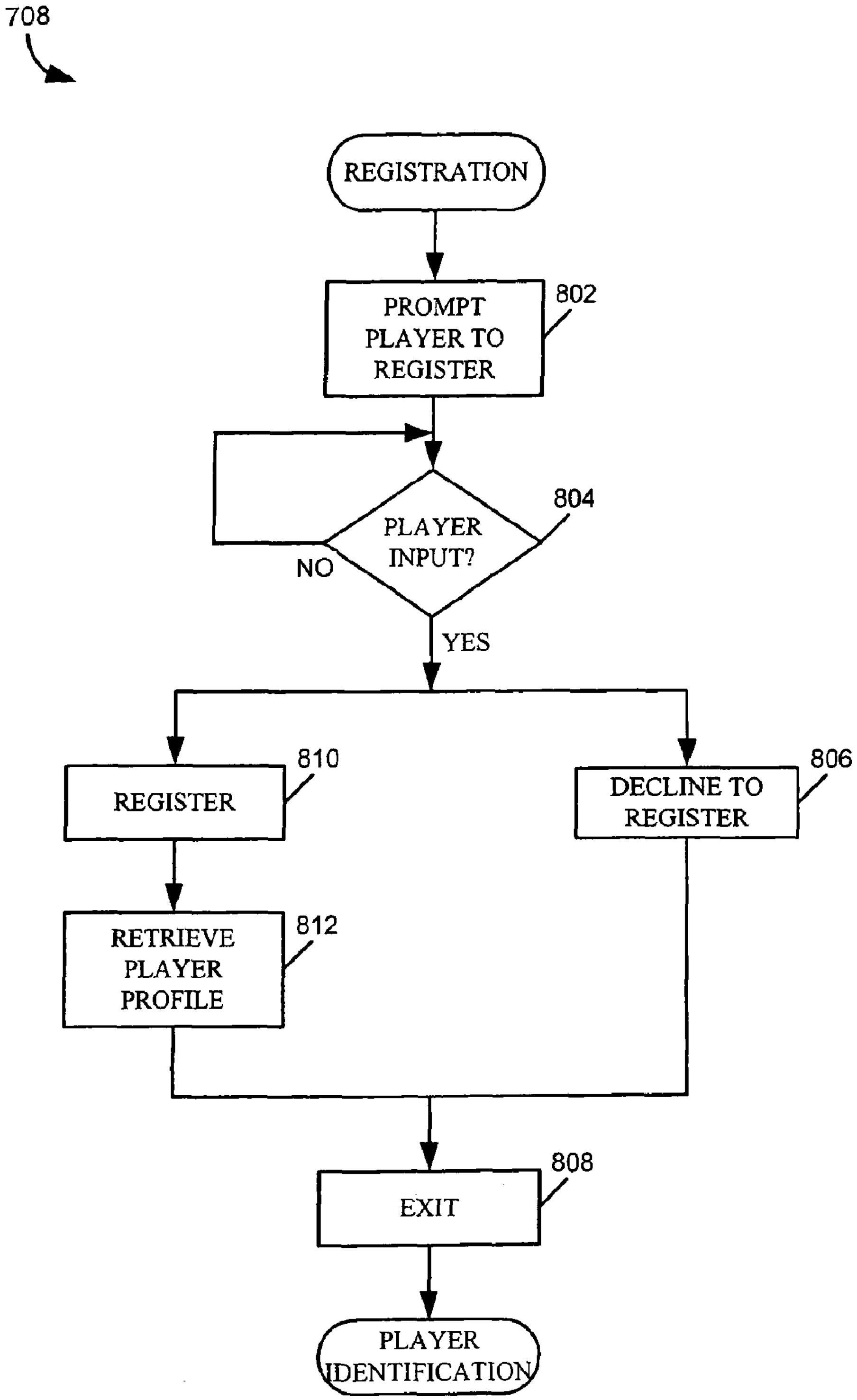
FIG. 18 is a flowchart of an embodiment of a registration routine that may be performed during operation of one or more of the gaming units.

FIG. 18 is a flowchart of the registration routine 708 shown schematically in FIG. 17. The registration routine 708 may be performed by the player tracking unit 26*a* as part of the player identification routine 205 or by an input terminal 54 when placing a wager on a remote multi-player game at an input terminal 54. Beginning at block 802, the player may be prompted with a visual message to register or decline to register for a remote multi-player game. During the prompt at block 802, if the player makes any input to the gaming unit 20 or input terminal 54 as determined at block 804, the visual message may be terminated. If the player input at block 804 is to decline to register for the remote multi-player game, control may pass to block 806 where a determination is made that the player declined to register. The registration routine 708 may then exit at block 808 and return to the player identification routine 205. If the registration is taking place at the input terminal 54, the player may be allowed to continue placing a wager on the remote multi-player game without registering though the player may not be permitted to view a display of or control the remote multi-player game from the gaming unit 20.

If the player input at block 804 is to register for the remote multi-player game, control may pass to block 810 for the player to register for the remote multi-player game. The player may enter information including the player identification and the ticket identification. The player tracking unit 26*a* may also read the player identification from the player identification device. Using the player identification, the player tracking unit 26*a* may retrieve player information from the player tracking server 26 at block 812. The player tracking server 26 may supply all or part of the player information stored by the player tracking server 26. Among the player information supplied by the player tracking server 26 may be information regarding the remote multi-player games that the player has wagered on. Using the player identification and/or the ticket identification, the player tracking server 26 may submit a request to the multi-player gaming server 58 via the bridge 40*a* for information regarding wagers made by the player, including the player selections, the amount of the wager, etc. This information may be transmitted back to the player tracking unit 26*a* via the player tracking server 26. Once the player information has been received by the player tracking unit 26*a*, the registration routine 708 may exit and pass control to the remote gaming routine 706.

Remote Game Play

Figure 19:
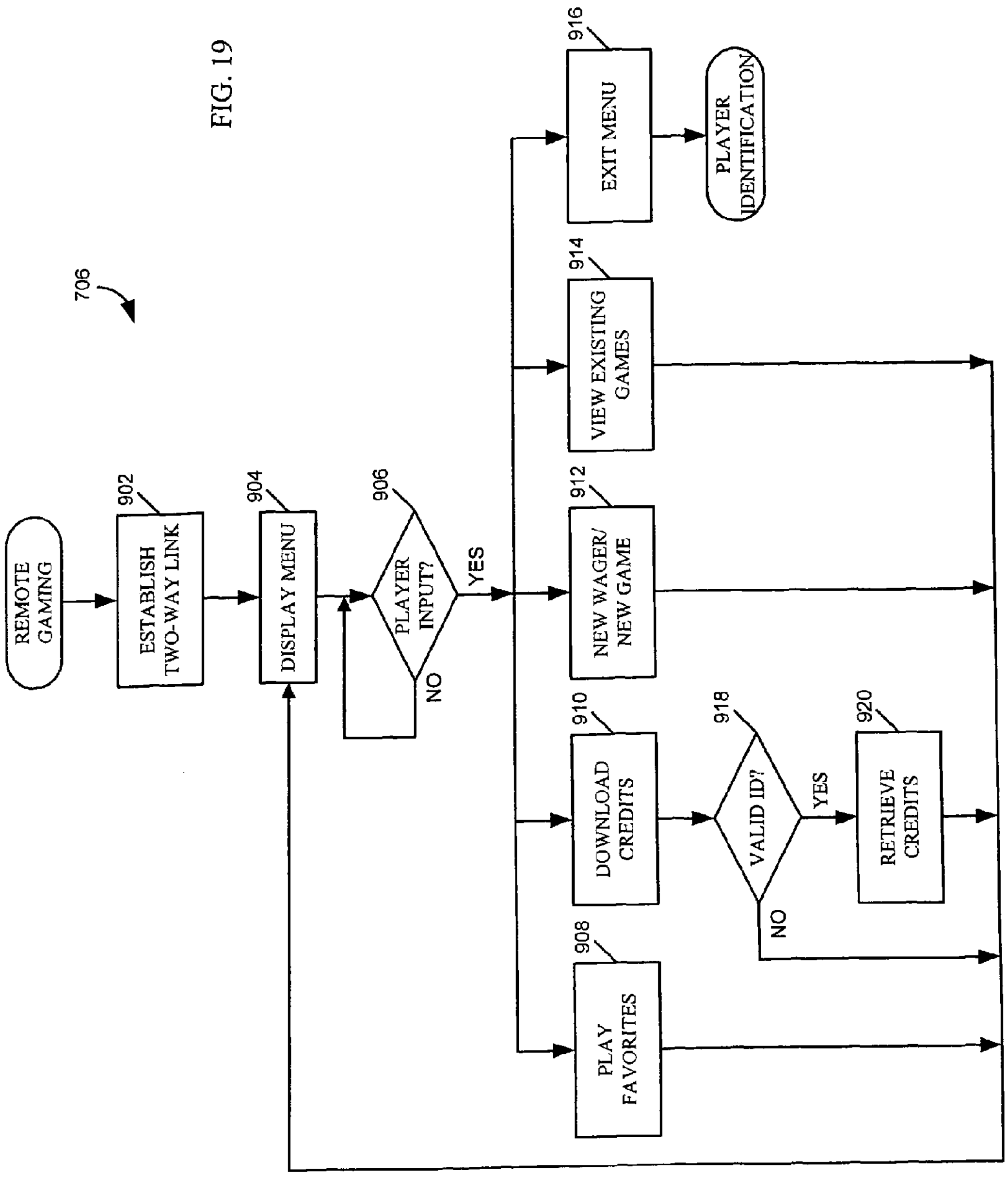
FIG. 19 is a flowchart of an embodiment of a remote gaming routine that may be performed during operation of one or more of the gaming units.

FIG. 19 is a flowchart of the remote gaming routine 706 shown schematically in FIG. 17. The remote gaming routine 706 may be performed by the player tracking unit 26*a* as part of the player identification routine 205. Beginning at block 902, a two-way information link may be established between the gaming unit 20 and the multi-player gaming server 58 for updating information concerning multi-player games wagered on by the player. The link may initially be established by having the player tracking unit 26*a* request player information from the player tracking server 26, which may include having the player tracking server 26 retrieve multi-player gaming information from the multi-player gaming server 58 via the bridge 40*a*. The multi-player gaming information may include wagers made by the player for a multi-player game, the amount of the wagers, the player's selections, etc. The information link may also supply updated information concerning the multi-player game. For example, with a sporting event, the status of the sporting event (e.g., a score) may be supplied and updated as the sporting event progresses. For a lottery game, the multi-player gaming information may include the randomly-selected game numbers selected by the multi-player gaming controller 52, including the randomly-selected game numbers as they are selected.

Once the multi-player gaming information has been retrieved and a link established to update the multi-player gaming information, control may pass to block 904 and a menu display may be generated on the display unit 70 to allow the player to select one of the remote multi-player gaming options being displayed. The menu display may include, for example, an option to play favorite gaming selections 908 (e.g., a player's favorite game numbers for a lottery), an option to download the player's credits from previous payouts 910, an option to place a new wager on a remote multi-player game or initiate a new remote multi-player game 912, view multi-player gaming information of an existing remote multi-player game in progress 914 or an option to exit the menu display 916. A selection of one of the menu options may be made by a player input at block 904 and detected at block 906 in various ways, including pressing any button on the gaming unit 20. Following the execution of any of the menu options at blocks 908, 910, 912, 914, control may pass back to block 904 to display the menu options again.

A player selection of the option to play favorite gaming selections at block 906 may pass control to block 908. For example, the player's favorite gaming numbers, as stored by the player tracking server 26 and downloaded by the player tracking unit 26*a*, for a remote lottery game may be transmitted to the multi-player gaming network 50. The player may be permitted to specify the amount of the new wager. A new wager may thereby automatically be placed on the lottery game using the player's favorite game numbers. The multi-player gaming server 58 may store the favorite game numbers, the amount of the wager and assign a ticket identification to the wager. A ticket may be printed by the ticket reader/printer 63 with the player's favorite game numbers, wager amount and the ticket identification. For a sporting event, a new wager may automatically be placed on the sporting event using a player's favorite team, player, etc.

A player selection of the option to download the player's credits at block 906 may pass control to block 910. The player's credits may be downloaded from the multi-player gaming server 58 and/or the player tracking server 26. The player credits may relate to an account established by the player prior to placing any wagers or as a result of receiving any payouts from previous wagers on the remote multi-player game. Prior to downloading the player credits, the player may be prompted with a visual display at block 918 to enter further player identification information, such as a predetermined personal identification number (PIN) established when the player registered for the remote multi-player game. If the player identification information is determined to be valid at block 918, control may pass to block 920 where the player's credits may be transferred from the multi-player gaming server 58 to the gaming unit 20. The downloaded player credits may be combined with existing player credits from previous payouts for games played locally on the gaming unit 20 such as from the video poker routine 210, the video blackjack routine 220, the slots routine 230, the video keno routine 240 and the video bingo routine 250. The combined credits may be used to place further wagers on a remote multi-player game and on locally played games. Alternatively, the downloaded player credits may be maintained separately from existing credits and used only to place wagers on remote multi-player games. If the player identification information is determined to not be valid at block 918, control may pass back to block 904 to generate the menu display. The player credits from remote multi-player games in progress may be automatically downloaded as payouts from the remote multi-player games occur.

A player selection of the option to initiate a new wager or new game at block 906 may pass control to block 912. The player may be presented with a visual display of the remote multi-player games available, including various multi-player lottery games, sporting events, payout tables, and any other information that may normally be provided to the player at an input terminal 54, on the multi-player gaming display 56, etc. prior to placing a wager. Alternatively, the player may be presented with the option of placing a new wager for a multi-player game that the player has previously registered for. The player may be allowed to make player selections such as an outcome of a sporting event, game numbers for a lottery, etc., and the amount of the wager. The player's gaming selections and the wager amount may be transmitted to the multi-player gaming server 58, where the wager is stored and associated with the player registration information. The multi-player gaming server 58 may assign a ticket identification which may be transmitted back to the gaming unit 20. The player tracking server 26 may likewise store this information as part of the player information. The gaming unit 20 may issue a ticket using the ticket reader/printer 63 with the player's selections, wager amount and the ticket identification.

A player selection of the option to view information regarding existing remote multi-player games in progress at block 906 may pass control to block 912. The information may be downloaded from the multi-player gaming server 58 in conjunction with the multi-player gaming controller 52. A visual display may be generated on the display unit 70 of remote multi-player games in progress that the player has previously wagered on such as a sporting event or lottery game. The visual display may include the same information provided on the multi-player gaming display 56 regarding the existing remote multi-player game. This may include a range of a video image of the status of a sporting event (e.g., a score) and the final outcome of the sporting event, real-time or near real-time video of the actual sporting event. For a lottery game, visual display may include a video image of a plurality of game numbers in a grid pattern representing the range of game numbers for the lottery game, the randomly-selected game numbers, etc., including updates of the randomly-selected game numbers are they are selected. In addition, the visual display generated at block 914 may include a representation of the player's selections for the remote multi-player game.

A player selection of the option to exit the display menu at block 906 may pass control to block 916. The remote gaming routine 706 may then terminate and the information link with the multi-player gaming server 58 may likewise be terminated. Control may be returned to the player identification routine 205.

FIGS. 20 and 21 are exemplary displays 1000, 1100 that may be shown on the display unit 70 during performance of the remote gaming routine 706 shown schematically in FIG. 19. The displays 1000, 1100 may be generated on the display unit 70 in response to player selection of the option to view information regarding existing remote multi-player games in progress at block 912. Referring to FIG. 20, the display 1000 may include a video image 1002 of the remote multi-player game in progress. In the present example, the video image 1002 may be a video image of a remote multi-player lottery game in progress. As mentioned above, the video image 1002 of the remote multi-player lottery game may include the same information provided on the multi-player gaming display 56 regarding the existing remote multi-player game, such as the plurality of game numbers in a grid pattern and the randomly-selected game numbers. The randomly-selected game numbers may be highlighted to distinguish them from non-selected game numbers. For example, the randomly-selected game numbers 12, 36, 52, 58, 76, and 82 have been highlighted to be distinguished from the remaining game numbers. The video display 1002 may be updated as new randomly-selected game numbers are selected. Unlike the multi-player gaming display 56, the video image 1002 may include the player's gaming selections for the remote multi-player game. For example, the player selected game numbers 12, 24, 43, 52, 76, and 82 for a remote multi-player lottery game are highlighted or otherwise distinguished from both the randomly-selected game numbers and the remaining game numbers. If one or more of the player selected game numbers and the randomly-selected game numbers are the same, they may be highlighted separately to distinguish them from all remaining numbers. In the present example, the game numbers 12, 52, 76 and 82 have been highlighted to distinguish them from the remaining player selected game numbers, the remaining randomly-selected game numbers and the remaining game numbers. In the case of a sporting event, the team, player, etc. involved in the sporting event that the player wagered on may be highlighted from the remaining teams, players, etc. The specific team, player, etc. that the player wagered on may be highlighted to be distinguished from the remaining teams, players, etc. even further. In the case of wagering on a specific score, spread, etc., the score of the sporting event may be highlighted in a particular color or otherwise distinguished to indicate that the player's prediction of the score, spread, etc. as it stands will result in a payout. For example, if the player has wagered that a football game will have a spread of 6 points, if the current score is within 6 points, the video image of the score may be highlighted in a particular manner to indicate the same.

To allow the player to control the play of the remote multi-player game, a plurality of player-selectable buttons may be displayed. The buttons may include some or all of the options presented with the display menu at block 904. The buttons may include a "Play Favorites" button 1004, a "Download Credits" button 1006, a "New Wager/New Game" button 1008, a "View New Game" button 1010, a "Select Ticket" button 1012, and an "Exit" button 1014. Additional buttons may include a "Cash Out" button 1016, a "See Pays" button 1018, a "Bet One" button 1020, a "Bet Max Credits" button 1022, and a "Select Number" button 1024. The display 1000 may also include an area 1026 in which the number of remaining credits or value is displayed. The number of remaining credits or value may relate to the credits or value for the remote multi-player game being viewed or all credits/value held by the player for all wagers, games, etc. A further button or buttons 1028 may be provided to allow the player to control the size of the video display 1000, which may include minimizing the size of the video display 1000, closing the video display 1000 and resizing the video display 1000. If the display unit 70 is provided with a touch-sensitive screen, the buttons 1004, 1006, 1008, 1010, 1012, 1014, 1016, 1018, 1020, 1022, 1024, 1028 may form part of the video display 1000. Alternatively, one or more of those buttons may be provided as part of a control panel that is provided separately from the display unit 70.

Referring to FIG. 21, the display 1100 may include a video display 1102 of the remote multi-player game in progress. In the present example, the video display 1102 includes an area 1104 in which the status of a sporting event is shown. The area 1104 may include a highlight of the team that currently has the lead in the sporting event (e.g., Team A) and a second highlight of the team wagered on by the player (e.g., Team B). The area 1104 may be used to display any status information regarding the sporting event (e.g., the current leader in a race, a score, time left, an inning, etc.). The video display 1102 may include a second area 1106 which displays a real time or near real time video image of the sporting event in progress. The video display 1102 may be displayed as a full size image using one of the buttons 1028*a*, though in the present example, the video display 1102 has been resized using a button 1028 similar to that shown in FIG. 20 such that the video display 1102 may be displayed in conjunction with a display 450 being shown during performance of the slots routine 230. Likewise, the video display 1000 may be resized to be displayed in conjunction with a game controlled by the gaming unit 20, and the video display 1102 may be resized to be the only video display being shown using buttons 1028*a*. If the video display 1102 is resized to be the only video display on the display unit 70, as with the video display 1000, the video display 1102 may include the buttons 1004, 1006, 1008, 1010, 1012, 1014, 1016, 1018, 1020, 1022, 1028 and the area 1026 as shown in FIG. 20. Either video display 1000, 1102 may be displayed concurrently with a display of any other game routines controlled by the gaming unit 20, including the displays 350, 400, 520, 600 of the video poker routine 210, the video blackjack routine 220, the video keno routine 240 and the video bingo routine 250 respectively. The display 450 may include all of the same buttons, areas and video images as discussed above to allow the player control over the game routine being wagered on locally at the gaming unit 20.

What is claimed is:

1. A gaming apparatus, said gaming apparatus located within a first geographic location, comprising:

a display unit;

a first value input device; and a controller operatively coupled to said display unit and said first value input device, said controller comprising a processor and a memory operatively coupled to said processor, said controller being programmed to allow a person to make a wager, said controller being programmed to cause a first video image representing a first game to be generated on said display unit, said first video image representing one of the following games wagered on said first value input device: video poker, video blackjack, video slots, video keno or video bingo, said first video image comprising an image of at least five playing cards if said first game comprises said video poker, said first video image comprising an image of a plurality of simulated slot machine reels if said first game comprises said video slots, said first video image comprising an image of a plurality of playing cards if said first game comprises said video blackjack, said first video image comprising an image of a plurality of keno numbers if said first game comprises said video keno, and said first video image comprising an image of a bingo grid if said first game comprises said video bingo, said controller being programmed to determine a first value payout associated with an outcome of said first game, said controller being programmed to cause a second video image to be generated on said display unit, said second video image representing a second game wagered on by said person at a second value input device located within a second geographic location other than within said first geographic location of said gaming apparatus, said second video image including content based on information regarding said second game received from one or more servers configured to transmit said information, said second video image representing one of the following games wagered on said second value input device: a multi-player lottery or a multi-player sports game, said first video image and said second video image displayed concurrently on said display unit, said second video image comprising an image of a plurality of lottery numbers if said second game comprises said multi-player lottery, and said second video image comprising an image of a sports score if said second game comprises said multi-player sports game.

2. A gaming apparatus as defined in claim 1, wherein said controller is programmed to allow said person to make said wager on at least one of said first game and said second game using said first value input device.

3. A gaming apparatus as defined in claim 1, wherein said controller is programmed to receive data representing a second value payout associated with an outcome of said second game, said second value payout data being determined by a multi-player gaming server of said one or more servers.

4. A gaming apparatus as defined in claim 1, wherein said first game is a single-player game.

5. A gaming apparatus as defined in claim 1, wherein said controller is programmed to receive identification information regarding said person, said controller being programmed to receive gaming information regarding said wager on said second game using said identification information, wherein said gaming information includes a gaming decision made by said person.

6. A gaming apparatus as defined in claim 1, wherein said second video image comprises an image of a gaming decision made by said person in relation to said second game.

7. A gaming system comprising a plurality of gaming apparatuses as defined in claim 1, said plurality of gaming apparatuses being interconnected to form a first network of said plurality of gaming apparatuses.

8. A gaming system as defined in claim 7, further comprising a second network operatively coupled to said first network, said second network comprising:

said second value input device; and a multi-player gaming server operatively coupled to said second value input device and included in said one or more servers, said multi-player gaming server being programmed to allow one or more people including said person to make said wager on said second value input device, said multi-player gaming server being programmed to determine a second value payout, and said multi-player gaming server being programmed to transfer gaming information regarding said second game to said controller, said gaming information including data representing said second value payout, and information regarding gaming decisions by said person for said second game.

9. A gaming apparatus, said gaming apparatus located within a first geographic location, comprising:

a display unit;

a first value input device; and a controller operatively coupled to said display unit and said first value input device, said controller comprising a processor and a memory operatively coupled to said processor, said controller being programmed to allow a person to make a wager, said controller being programmed to cause a first video image to be generated on said display unit, said first video image representing a first game wagered on said first value input device, said controller being programmed to determine a first value payout associated with an outcome of said first game represented by said first video image, and said controller being programmed to cause a second video image to be generated on said display unit, said second video image representing a second game wagered on by said person at a second value input device located within a second geographic location other than within said first geographic location of said gaming apparatus, said second video image including content based on information regarding said second game received from one or more servers configured to transmit said information, said first video image and said second video image displayed concurrently on said display unit.

10. A gaming apparatus as defined in claim 9, wherein said controller is programmed to allow said person to make said wager on at least one of said first game and said second game using said first value input device.

11. A gaming apparatus as defined in claim 9, wherein said controller is programmed to receive data representing a second value payout associated with an outcome of said second game, said second value payout data being determined by a multi-player gaming server of said one or more servers.

12. A gaming apparatus as defined in claim 9, wherein said first game is a single-player game and said second game is a multi-player game.

13. A gaming apparatus as defined in claim 9, wherein said second video image represents one of the following games: a multi-player lottery or multi-player sports gaming, said second video image comprising an image of a plurality of lottery numbers if said second game comprises said multi-player lottery, and said second video image comprising an image of a sports score if said second game comprises said multi-player sports gaming.

14. A gaming apparatus as defined in claim 9, wherein said controller is programmed to receive identification information regarding said person, and said controller being programmed receive gaming information regarding said wager on said second game using said identification information, wherein said gaming information includes a gaming decision made by said person.

15. A gaming apparatus as defined in claim 9, wherein said second video image comprises an image of a gaming decision made by said person in relation to said second game.

16. A gaming system comprising a plurality of gaming apparatuses as defined in claim 9, said plurality of gaming apparatuses being interconnected to form a first network of said plurality of gaming apparatuses.

17. A gaming system as defined in claim 16, further comprising a second network operatively coupled to said first network, said second network comprising:

said second value input device; and a multi-player gaming server operatively coupled to said second value input device and included in said one or more servers, said multi-player gaming server being programmed to allow one or more people including said person to make a wager on said second value input device, said multi-player gaming server being programmed to determine a second value payout, and said multi-player gaming server being programmed to transfer gaming information regarding said second game to said controller, said gaming information including data representing said second value payout, and information regarding gaming decisions by said person for said second game.

18. A gaming system as defined in claim 17, wherein said plurality of gaming apparatuses are interconnected via the Internet.

* * * * *